United States Patent
Stipech et al.

(10) Patent No.: US 12,131,317 B2
(45) Date of Patent: Oct. 29, 2024

(54) ASSET PACK RECOMMENDATION AND MANAGEMENT

(71) Applicant: Block, Inc., Oakland, CA (US)

(72) Inventors: Kristopher David Stipech, New York, NY (US); Ryan Budd, San Francisco, CA (US); Daniel Shin, New York, NY (US); River Satya, San Francisco, CA (US); Brian Grassadonia, San Francisco, CA (US); Emily Chiu, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/838,065

(22) Filed: Jun. 10, 2022

(65) Prior Publication Data

US 2022/0309493 A1    Sep. 29, 2022

Related U.S. Application Data

(63) Continuation of application No. 16/457,877, filed on Jun. 28, 2019, now abandoned.

(60) Provisional application No. 62/715,780, filed on Aug. 7, 2018.

(51) Int. Cl.
*G06Q 20/38* (2012.01)
*G06Q 20/10* (2012.01)

(52) U.S. Cl.
CPC ......... *G06Q 20/3821* (2013.01); *G06Q 20/10* (2013.01)

(58) Field of Classification Search
CPC ........................... G06Q 20/3821; G06Q 20/10
USPC .......................................................... 705/44
See application file for complete search history.

(56) References Cited

U.S. PATENT DOCUMENTS

| | | | |
|---|---|---|---|
| 2003/0208432 A1* | 11/2003 | Wallman | G06Q 40/06 705/36 R |
| 2009/0198632 A1* | 8/2009 | Dillahunty | G06Q 40/06 705/36 R |
| 2009/0240586 A1 | 9/2009 | Ramer et al. | |
| 2010/0280976 A1 | 11/2010 | Carpenter et al. | |

(Continued)

FOREIGN PATENT DOCUMENTS

WO    2019/016685 A1    1/2019

OTHER PUBLICATIONS

Advisory Action mailed Apr. 28, 2020, for U.S. Appl. No. 16/457,877, of Stipech K.D., et al., filed Jun. 28, 2019.

(Continued)

*Primary Examiner* — Paul S Schwarzenberg
(74) *Attorney, Agent, or Firm* — Polsinelli P.C.

(57) ABSTRACT

In one embodiment, a method includes obtaining, by a payment service system, an amount of security assets via a securities exchange system. The method includes determining amounts of security assets owned by the payment service system and users of the payment service system. The method includes receiving, via an application of the payment service system executing on a device of a user of the payment service system, a request from the user to sell an amount of a security asset owned by the user. The method includes facilitating execution of a sale of the amount of security assets. The method includes, prior to the sale request settling, depositing, by the payment service system, a currency account of the user with an amount of funds associated with a determined value of the security asset requested to be sold by the user.

28 Claims, 12 Drawing Sheets

(56) References Cited

U.S. PATENT DOCUMENTS

| | | |
|---|---|---|
| 2011/0264581 A1 | 10/2011 | Clyne |
| 2012/0047054 A1 | 2/2012 | Vasinkevich |
| 2012/0054121 A1* | 3/2012 | Fiala .................. G06Q 40/06 705/36 R |
| 2012/0109749 A1 | 5/2012 | Subramanian et al. |
| 2013/0218657 A1 | 8/2013 | Salmon et al. |
| 2014/0164164 A1 | 6/2014 | Rabenold et al. |
| 2015/0073929 A1 | 3/2015 | Psota et al. |
| 2016/0371780 A1* | 12/2016 | Barratt .................. G06Q 40/06 |
| 2017/0109823 A1 | 4/2017 | Crosthwaite et al. |
| 2018/0137570 A1* | 5/2018 | Worden ................ G06Q 40/04 |

OTHER PUBLICATIONS

Final Office Action mailed Jan. 6, 2021, for U.S. Appl. No. 16/457,877 of Stipech, K. D. et al., filed Jun. 28, 2019.
Final Office Action mailed Mar. 6, 2020, for U.S. Appl. No. 16/457,877, of Stipech K.D., et al., filed Jun. 28, 2019.
Final Office Action mailed Mar. 18, 2022, for U.S. Appl. No. 16/457,877 of Stipech, K. D. et al., filed Jun. 28, 2019.
Non-Final Office Action mailed Dec. 30, 2019, for U.S. Appl. No. 16/457,877, of Stipech K.D., et al., filed Jun. 28, 2019.
Non-Final Office Action mailed Jul. 14, 2020, for U.S. Appl. No. 16/457,877 of Stipech, K. D. et al., filed Jun. 28, 2019.
Non-Final Office Action mailed Oct. 19, 2021, for U.S. Appl. No. 16/457,877 of Stipech, K. D. et al., filed Jun. 28, 2019.

* cited by examiner

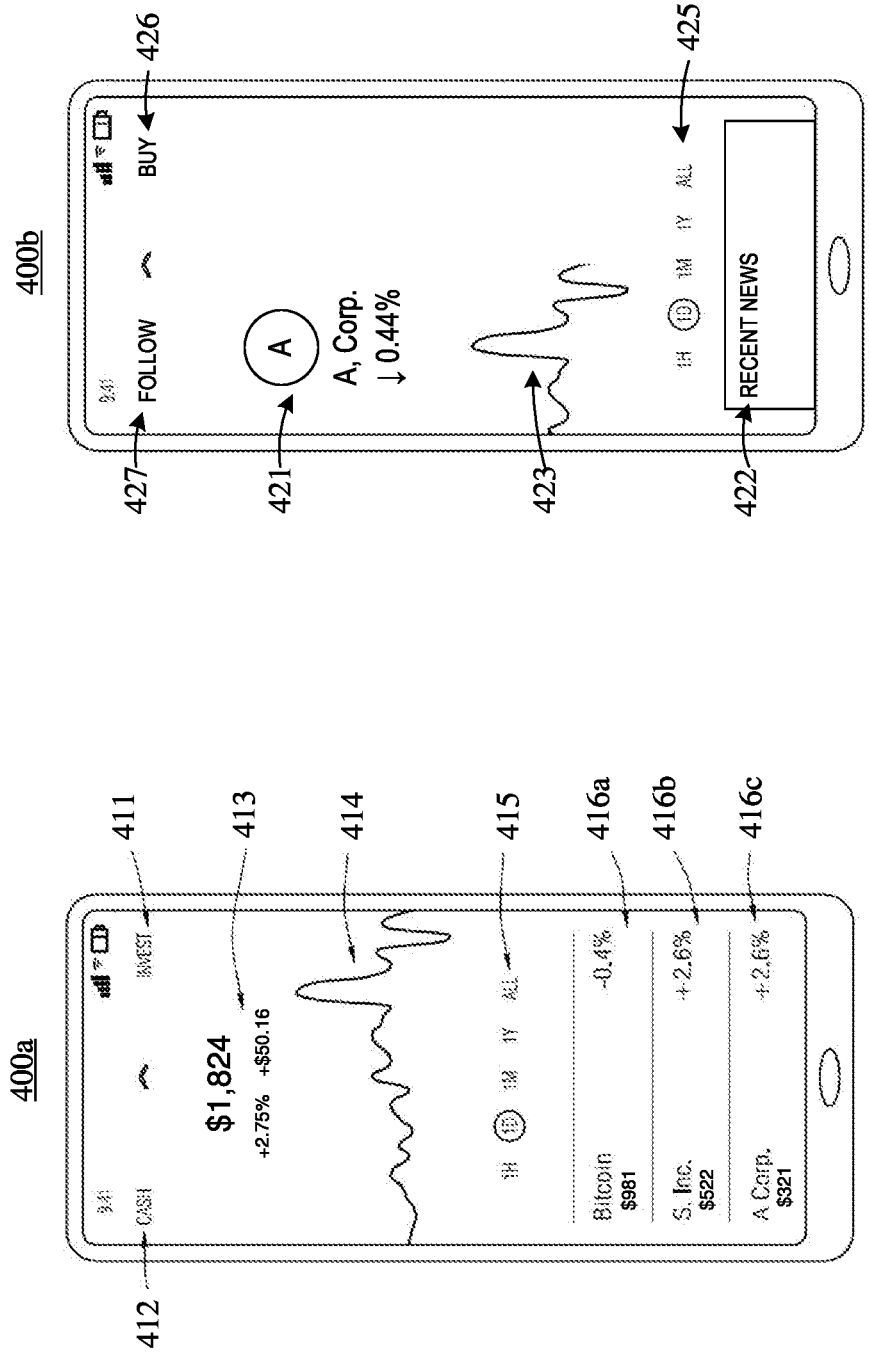

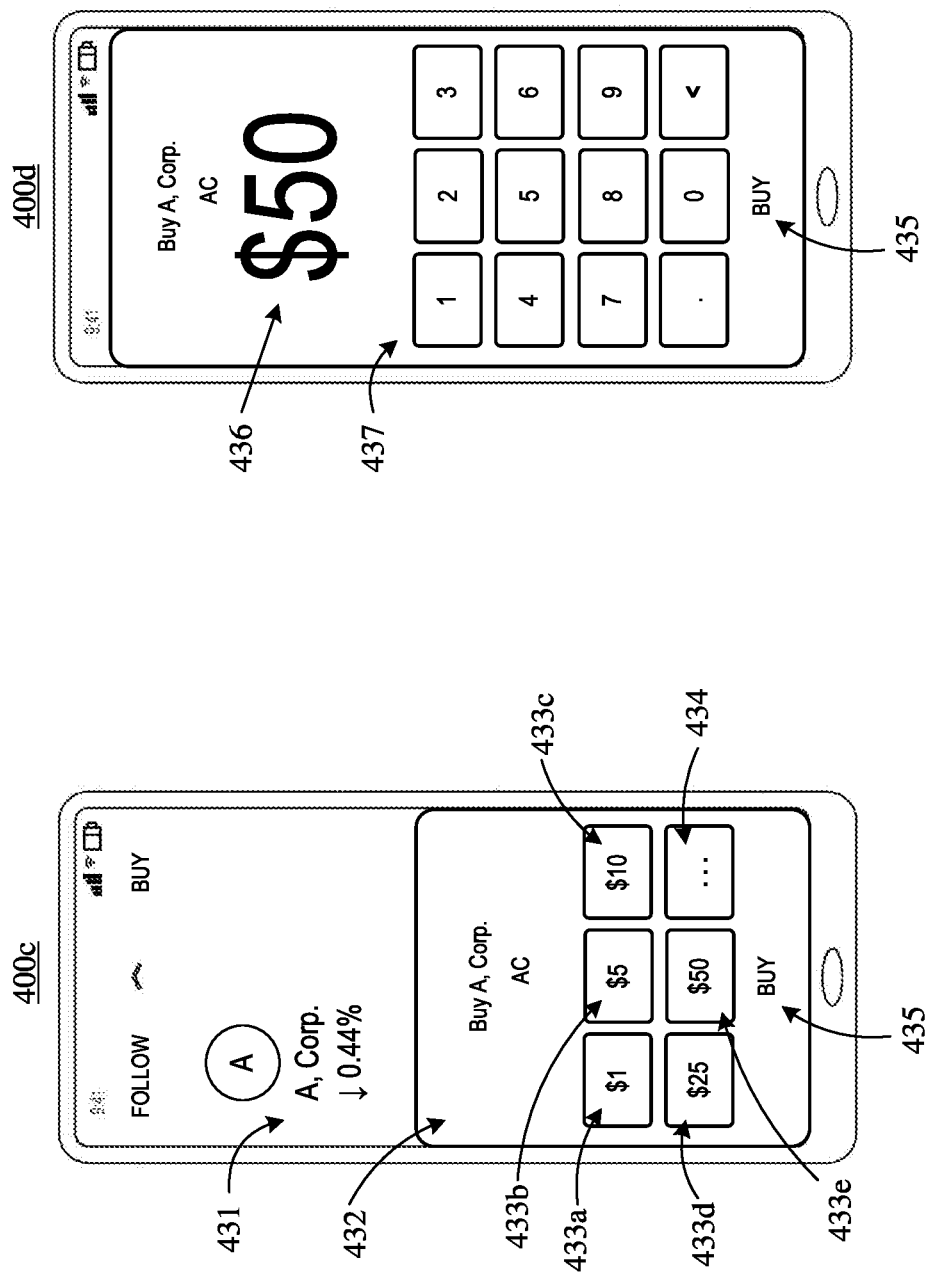

ASSET PACK RECOMMENDATION AND MANAGEMENT

PRIORITY

This application is a continuation of U.S. patent application Ser. No. 16/457,877 filed Jun. 28, 2019 entitled "CUSTOMIZED ASSET GROUPING", which claims the benefit, under 35 U.S.C. § 119(e), of U.S. Provisional Patent Application No. 62/715,780, filed Aug. 7, 2018, all of which are incorporated herein by reference.

BACKGROUND

Security assets such as stocks, derivatives, bonds, and debentures have long been used by the public as investment instruments. A security may represent debt, equity, or may be a derivative of other assets. A security may be represented by a tangible certificate, or electronically by data records. Investors may acquire or trade securities in primary or secondary markets. Various security exchanges allow investors to buy and sell securities. One or more online platforms may be provided by the security exchanges or one or more brokers of securities. Investors may access the online platforms through a browser, a mobile application, or other suitable software. The online platform may display information about securities (e.g., pricing information), provide analysis tools, receive orders from the investors, and communicate with other systems to cause the orders to be executed.

BRIEF DESCRIPTION OF THE DRAWINGS

FIGS. 4A-4H illustrate example user interfaces for purchasing security assets using an example mobile application associated with a payment service system.

DESCRIPTION OF EXAMPLE EMBODIMENTS

Figure 1A:
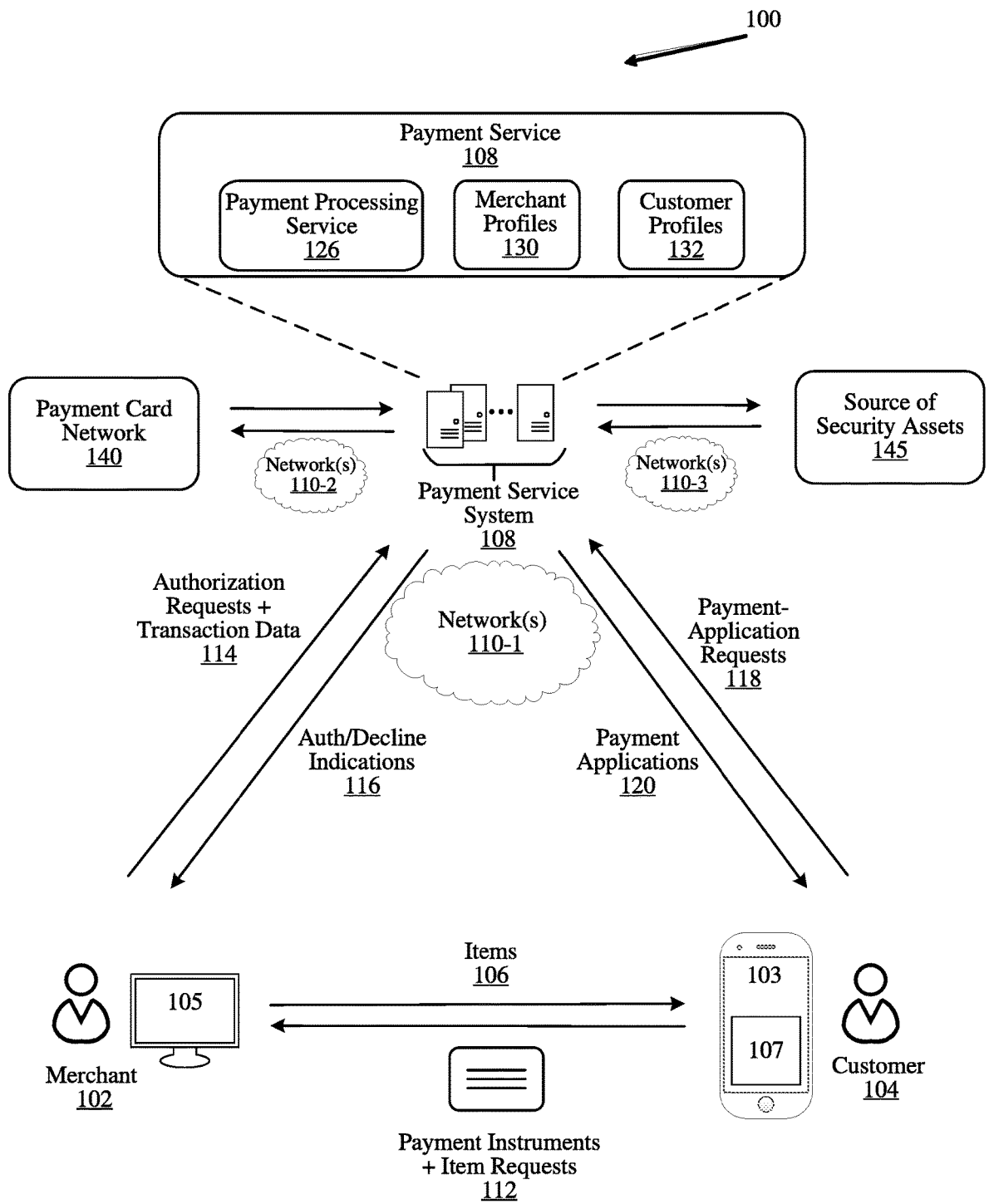
FIGS. 1A and 1B illustrate an example payment service system network.

Particular embodiments described herein enable management of security assets along with fiat currency and other assets through a payment service system, purchase and sale of security assets in fractions of their base units, and payment transactions using arbitrarily specified quantities of available security assets. Particular embodiments described herein enable a user to access proceeds from the sale of a security asset (e.g., one or more fiat currencies) immediately after the sale. Particular embodiments allow for easy customization of the security asset purchase experience through recommendations for both the identity of the assets purchased and the quantity or value of those assets. Particular embodiments substantially reduce the cost and improve the efficiency associated with transfer of security assets.

To date, although security assets are widely held among the public, they have not been used as instruments for making everyday payments and are generally not accepted by merchants (e.g., retailers), as compared to other asset types (e.g., fiat currency or cryptocurrency). Several factors prevent the use of security assets as payment instruments. First, the transfer of a security asset is generally associated with longer transaction times than a simple transfer of fiat currency. As the value of security assets may fluctuate with respect to the fiat currency, accepting security assets may add to the risk for merchants. Second, exchanges and brokers often do not allow the purchase or transaction of security assets in fractions of their base units (e.g., a share of a stock). As base units of security assets can often be expensive (e.g., thousands of dollars), it may be impossible to transfer the exact value of a payment using units of security assets. Third, a transfer of security assets may involve substantial transaction costs that are likely to be imposed on merchants or customers.

In particular embodiments, a payment service system may provide a platform for its users to purchase, sell, transfer, control, or otherwise manage their security assets. The payment service system may acquire security assets from one or more third-party sources of such assets (e.g., a stock exchange) and allow its users to purchase all or a portion of the security assets. In particular embodiments, the payment service system may manage one or more financial accounts for the user. Each financial account may hold an actual or representative quantity of fiat currency owned by the user or other assets owned or assigned to the user (e.g., securities, cryptocurrency tokens). The payment service system may also have access to one or more financial accounts associated with the user that are managed by one or more third-party systems (e.g., banks). In particular embodiments, the payment service system may provide the security assets that it acquired for sale to its users. A user may purchase security assets held by the payment service system using, for example, money managed by the payment service system, money in a checking account that the user has authorized the payment service system to access, cryptocurrency stored in a wallet provided by or accessible by the payment service system, other suitable assets, or any combination thereof. In particular embodiments, when a user purchases security assets from the payment service system, the payment service system may refrain from directly transferring title to the security assets to the user. Rather, the payment service system may continue to control the security assets and may record and track user ownership interests using a data structure to indicate the user's ownership interest in the security assets. In other words, particular embodiments may provide an asset management service between users and markets for security assets. By practicing the techniques of embodiments described herein, the payment service system improves the processing speed and network bandwidth of an asset management service involving transactions between users and markets for security assets, while also serving to increase the efficiency and flexibility of such transactions.

In particular embodiments, the payment service system may maintain a data structure designed for recording asset ownership for various users. As an example and not by way of limitation, the payment service system may store one or more ledgers for tracking assets held by the payment service system—each such asset being held by the payment service system may be owned in whole or in part by the payment service system itself and/or in whole or in part by one or more users of the payment service system. The ledger(s) may store service balances associated with the payment service system representing quantities of assets held by the payment service system. The service balances may comprise, for example, a fiat currency balance for each of one or more fiat currencies, a securities balance for each of one or more security assets, a cryptocurrency balance for each of one or more cryptocurrencies, other suitable data records, or any combination thereof. The payment service system may also store additional ledgers for each of a number of users. The ledger(s) may be stored as part of a profile for each user. One or more ledgers may store user balances representing quantities of assets held by the payment service system and owned by one or more users. They may have similar contents to the service balances. The payment service system may use other data structures suitable for storing information representing ownership of assets.

In particular embodiments, a user may purchase security assets through the payment service system by sending a purchase order to the payment service system. The user may cause the purchase order to be generated by interacting with one or more elements in a user interface associated with the payment service system. The user interface may be provided, for example, in a mobile application provided by the payment service system or on a webpage displayed by a browser installed on a computing device. The purchase order may specify a particular security asset (e.g., stock of a particular company) and a quantity or value (e.g., 0.3 shares of X company stock, or $50 of X company stock) of the security asset to purchase. The payment service system may compute a price for the requested amount of the security asset, then execute the purchase by updating one or more internal ledgers. For example, the payment service system may decrease a US dollar balance associated with the user by the computed price and increase a securities balance associated with the user by the requested amount of the specified security asset. The payment service system may correspondingly increase a US dollar balance associated with the payment service system by the computed price and decrease a security balance associated with the payment service system by the requested amount of the specified security asset. The change in price for the requested quantity of the security asset may be calculated based on a current market price of the security asset.

In particular embodiments, the payment service system may dynamically recommend purchase quantities to a user seeking to purchase a particular asset. For example, the user interface presented to a user generating a purchase order for security assets may comprise several options for the quantity (expressed with reference to a fiat currency, or in fractional shares) of a particular security asset to purchase. The options may include default, or average, purchase-size options, lower than average options, small purchase-size options, higher than average options, or stretch purchase-size options. The payment service system may provide dynamic purchase quantity recommendations based on a variety of types of information about the user available to the payment service system. For example, the payment service system notes the balance of a user's primary account, or an account often used to provide funds to purchase security assets and adjust the options presented to the user accordingly. As another example, the payment service system notes a user's purchase history (e.g., goods, services, or security assets) from transactions involving a payment application, physical transaction card or virtual card provided by the payment service system, and generate and present purchase quantity options based on the purchase history. As another example, the payment service system accesses demographic information associated with the user and compares purchase behavior of other users sharing the demographic information to generate and present purchase quantity options. Dynamically recommending purchase quantities to a user seeking to purchase a particular asset provides technological advancements to the payment service system by, for example, reducing the number of interactions (e.g., input events to a user interface) required by the user to complete the purchase. The system may be enabled to provide purchases more quickly than prior solutions by acting on anticipated actions prior to the user actually engaging them, for example by pre-authorizing transactions based on predicted behavior and pre-generating results in one or more ledgers maintained by the payment service system.

Although the security assets being purchased are held by the payment service system, the payment service system records and tracks user ownership interests using its ledgers. Ownership interests in security assets may be transferred in the payment service system based on reassigning ownership thereof on the ledgers. Thus, the payment service system may transfer a currency value for a security asset transaction prior to the transaction settling with a clearing broker or securities exchange platform by reassigning ownership of the security asset ownership interests and ownership of currency on the ledgers. Furthermore, the user may be able to purchase and sell fractional shares of the security assets. For example, a user may be allowed to buy 2.4 shares of a particular company. In particular embodiments, the user may be provided the opportunity to determine a method and manner of payment most convenient to the user. For example, when purchasing 2.4 shares of the particular company, the user may be provided with the option of paying for the 2.4 shares using a single lump sum based on a specified dollar amount (e.g., the current trading value of the security asset at a time relevant to the purchase transaction). The user may also have the option of paying for the 2.4 shares using a payment plan, where they pay for a portion of the total amount on a periodic basis. As another example, the user may be provided with the option of a recurring purchase in which the payment service system may automatically debit a dollar amount or percentage of the user's currency to purchase fractional shares towards a stated goal. Such flexibility is often unavailable in prior systems for investment in certain asset classes. In particular embodiments, the user may send a sell order of a particular security asset to the payment service system. Based on the ledger-based assignment of ownership used by the payment service system, the user may be able to sell fractional shares of the security assets. For example, a user may be allowed to sell 1.8 shares of a particular company. In particular embodiments, the user may be provided the opportunity to determine a method and manner of sale most convenient to the user. For example, when selling 1.8 shares of the particular company, the user may be provided with the option of selling the 1.8 shares using a single lump sum based on a specified dollar amount (e.g., the current trading value of the security asset at a time relevant to the purchase transaction). The user may also have the option of selling the 1.8 shares using a payment plan, where ownership is reassigned at once, but the user receives a portion of the total amount of the sale on a periodic basis. As another example, the user may be provided with the option of a recurring sale in which the payment service system may automatically sell a dollar amount or percentage of the user's owned shares (e.g., $50 worth, or 0.5 shares per week) to sell fractional shares towards a stated goal (e.g., $250 total, or 1.8 shares total). The payment service system may execute this transaction by, for example, increasing a currency balance and decreasing a security balance of the user, while at the same time, decreasing a currency balance and increasing a security balance of the payment service system. Through use of the ledger-based system, the payment service system may provide for faster transactions, and faster clearing transactions than available with prior solutions. For example, the payment service system need not wait for confirmation of transfer from one or more banks, clearing houses, exchanges or other institutions that may be involved in traditional financial transfers. Thus, the ledger-based system enables many improvements to prior systems, as described herein.

In particular embodiments, the payment service system may store information regarding each of the security assets being held by the payment service system, such as, by way of example and not limitation, a type of the security asset, a name of a company associated with the security asset, a history of users that have owned the security asset, one or more classifications for the security asset and company associated with the security asset, a date of purchase of the security asset, a purchase price for the security asset, a length of holding of the security asset, any other suitable information, and any combination thereof.

The payment service system may also facilitate user-to-user transfer of security assets. In particular embodiments, a first user may transfer a quantity of security assets to a second user via the payment service system. For example, the payment service system may receive a request for security-asset transfer, the request identifying the first user, the second user, a particular security asset to be transferred, and a quantity of the security asset to be transferred. In response to the request, the payment service system may execute this transfer by modifying the respective securities balances of the first user and the second user. In particular embodiments, two users may reach a deal to swap assets and may cause the deal to be executed through the payment service system. Each user may send a digital signature to the payment service system approving the transaction. In response, the payment service system may execute the transaction by updating the account balances and ownership interests of the users corresponding to the assets. For example, a first user may swap 2.5 shares of a Company A for 110 shares of a Company B owned by a second user. After receiving a corresponding request, the payment service system may decrease the balance of Company A stock assigned to the first user and increase the balance of Company A stock assigned to the second user. At the same time, the payment service system may increase the balance of Company B stock assigned to the first user and decrease the balance of Company B stock assigned to the second user. In some embodiments, the assets may be of the same asset class (e.g., all exchanged assets are stocks as in the preceding example). In some embodiments, the assets may be of different asset classes. For example, a first user may swap 1 bitcoin and 10 shares of Company A stock for municipal bonds of a $5,000 face value. In particular embodiments, the payment service system may facilitate the unilateral transfer of security assets from a first user to a second user. A first user who has purchased a security asset may unilaterally transfer a security asset to a second user of the payment service system as a gift to the second user. The second user may be alerted of a request to initiate the transfer of the asset. The second user may be prompted to accept the transfer of the security asset; in some embodiments, the second user may do so by sending a digital or electronic signature to the payment service system. The payment service system may then execute the transfer prior to interfacing with a third-party security exchange platform. In particular embodiments, to execute the transfer, the payment service system may decrease the balance of the security asset assigned to the first user and increase the balance of the security asset assigned to the second user. In particular embodiments, to execute the transfer, the payment service system may first initiate a transfer of the desired amount of the security asset from the first user to the payment service system. The payment service system may next initiate a transfer of the desired amount of the security asset from the payment service system to the second user. The payment service system as described greatly simplifies the processes used by users to transfer and transact security assets of various classes and can automatically facilitate the exchange of those security assets from one asset class (e.g., stocks) to another (e.g., cryptocurrency, currency). The payment service system presents a simplified and streamlined interface for doing so, reducing the interactions needed for a user to perform what, in previous systems, was a complex and highly interactive task. Furthermore, the payment service system improves the speed of these transactions by reducing lag time caused by waiting for various parties and systems to communicate. Additionally, the payment service system may enable entirely new methods of transacting between users, customers, and merchants. Therefore, for this and many other reasons, the payment service system represents a significant technical improvement over previous systems.

In particular embodiments, the payment service system may facilitate users to invest in groups or packs of security assets. The payment service system may send, to a client device associated with a user, instructions to display one or more packs of security assets, and optionally a recommendation for the one or more packs. Each pack may comprise a plurality of security assets. The security assets for a particular pack may be identified based on one or more criteria, such as industry, stage of growth, risk management, diversity, other suitable criteria, or any combination thereof. As an example and not by way of limitation, a pack may comprise ten stocks associated with five emerging companies and five well-established companies providing cloud computing services. As another example and not by way of limitation, a pack may comprise a combination of stocks, bonds, and gold futures. Each security asset included in a pack may be assigned a particular weight. The weight may be specified by a currency value at a particular time point (e.g., equivalent U.S. dollar value at the time of purchase), by units used to measure the security assets (e.g., a different number of shares associated with each security asset), by fraction of total current value of the pack, by any other suitable weighting measure, or any combination thereof. A user may request to purchase a particular value of a particular recommended pack (e.g., $100 of a cloud-computing pack). In response, the payment service system may calculate a respective value assigned to each of the security assets included in the pack and update data records representing ownership of these assets accordingly. In particular, the payment service system may debit a currency balance associated with the user in the amount of the particular value while crediting multiple securities balances associated with the user and corresponding to the security assets included in the pack. The payment service system may also credit a currency balance of the payment service system in the amount of the particular value and debit multiple securities balances of the payment service system and corresponding to the security assets included in the pack. In particular embodiments, the user may pay for the pack using assets other than fiat currency (e.g., cryptocurrencies, other stocks, etc.). In particular embodiments, the payment service system may also prompt a user to create a pack of security assets. The user may create a personalized, or customized asset pack by identifying a value or amount of various security assets to be included in the pack and the weight assigned to each of the assets, or by identifying a value or amount of various criteria to be included in the pack (e.g., industry, etc., as recited above) and the weight assigned to each of the criteria.

In particular embodiments, the payment service system may select or recommend packs comprising particular security assets or classes of security assets for a particular user. For example, the payment service system may access demographic information about a particular user, compare the user to other users in similar demographic groups, and recommend a security asset pack comprising security assets that are popular among users in the similar demographic groups. Furthermore, all examples can also be implemented in an opposite fashion—for example, for investors who want to be contrarian with respect to their peers, or who want geographic diversity, or who want to invest in places where they don't shop. As another example, the payment service system may access a geographic location associated with the user and recommend a security asset pack comprising companies associated with (e.g., with a principal place of business in or historical relationship to) that geographic location. As another example, the payment service system may have access to a transaction history of the user and may recommend a security asset pack comprising companies of which the user is a frequent customer. In general, the payment service system may further dynamically adjust the security assets in a predetermined pack according to the implicit or expressed preferences of the user or based on information about or relating to the user to which the payment service system has access. For example, the payment service system may generate a security asset pack based on a broadly applicable commonality (e.g., all companies have a female founder or chief executive officer). When recommending the pack to user, the exact security assets included in the pack may be personalized to the user and vary based on the personal preferences of each individual user such that a first user may be provided a pack with different security assets than a second user. Recommending security asset packs in this manner provides technological improvements to the payment service system by allowing the payment service system to pre-purchase or pre-authorize expected transactions, reducing the latency between user interaction with the payment service system and execution of the security asset transaction. Expected transactions may include purchasing additional security assets where needed in anticipation of a user selection of a particular asset pack, for example, if an insufficient amount is currently owned by the payment service system. These benefits may be provided to individual users, such as users about whom more information is available, or to users of the payment service system at large when the expected transactions relate to popular or trending asset packs. Recommendations for security asset packs may also reduce the amount of user interactions (e.g., with a user interface) necessary to process a security asset pack transaction. Streamlined interfaces may be used to accommodate user purchase of security asset packs where the transaction is more easily anticipated, for example, because the user desires to purchase a recommended asset pack without requiring further customization. Recommendations for security asset packs therefore facilitate faster overall processing of the payment service system and especially portions of the payment service system involved with security asset acquisition.

In particular embodiments, the payment service system may facilitate payments using security assets as the form of payment. A customer may use the payment service system to pay for a product or service provided by a merchant (e.g., in-store or online purchase). The customer may opt to make the payment using security assets held by the payment service system and owned by the customer rather than a fiat currency. In particular, the payment service system may receive a request for payment from a point-of-sale system associated with a merchant. The request for payment may specify a payment amount in a fiat currency. The payment service system may provide the customer multiple payment options. The customer may select an option to pay using security assets. The payment service system may calculate a quantity of a security asset of an equal value to the payment amount based on a current price of the security asset. The payment service system may then initiate a transfer of the determined amount of the security asset from the customer to the payment service system and a transfer of fiat currency of the payment amount from the payment service system to the merchant. In this manner, the payment service system may allow the customer to pay in security assets and the merchant to be paid in a fiat currency.

In particular embodiments, in addition to paying for goods or services directly using security assets, the payment service system may facilitate the immediate sale of security assets to allow proceeds from that sale to be used for goods or services with minimal delay. A customer may opt to use the payment service system to pay for a product or service provided by a merchant. The merchant may decide they do not wish to receive payment in the form of security assets directly. However, the customer may not have enough fiat currency in their account to settle their bill with the merchant. The customer may choose to sell a portion of their holdings in one or more security assets. The payment service system may receive this sell command and designate the security assets to be sold on a public exchange. In particular embodiments, the payment service system may calculate an expected yield of a sale of security assets selected by the customer. The payment service system may recommend the user to select one or more additional or alternative security assets for the sale to improve the customer's yield on transaction. The payment service system may recommend one or more additional or alternative security assets for the sale to minimize the capital loss experienced by the user due to the sale. The payment service system may note the sale price authorized by the customer and the quantity of assets sold and the operator of the payment service system (or a third-party partner) may provide the customer with credit for the proceeds of the sale immediately after the customer's ownership of such assets is verified. After the transaction clears the market, the operator of the payment service system (or the third-party partner) may be reimbursed for the credit provided to the customer from the actual proceeds of the sale. Thus, from the customer's perspective they receive proceeds from the sale instantly and can use those funds as needed. This improves the experience for the user over previous systems in which the customer must wait for the sale transaction to settle, typically with a third party service, before receiving their proceeds from the sale of security assets.

Furthermore, expedited settlement, achieved through the internal management of accounts and asset ownership attributed to the customer and the payment service system, also provides a technological advancement over prior systems at least by reducing the number of network interface calls to a third-party service (e.g., security exchange platform) that must be performed in real-time before a customer can access funds received from the sale of a security asset. As an example, the payment service system may batch process certain transactions (such as non-critical reimbursement sales of security assets) during off-peak usage hours. This batch processing—enabled by the internal management of user accounts and asset ownership in accordance with the present examples—allows the payment service system to reduce the computational burden and network congestion that can arise from a multitude of inbound transaction requests being received at a servicing platform concurrently or in quick succession. Accordingly, embodiments disclosed herein provide technical advantages over prior solutions by reducing network traffic and improving network bandwidth in asset management systems that enable customers to purchase and sell securities and related assets.

According to particular embodiments, the payment service system may provide funds to a user's account immediately upon receiving a request to sell a security asset. For example, the payment service system may reassign ownership interests of the security asset and a corresponding amount of currency in the payment service system's ledgers. In doing so, the payment service system may provide the funds on credit without charging the user interest. The payment service system may additionally or alternatively coordinate with one or more partners, affiliates, or third-parties that will provide the funds on credit to the user on similar terms. As such, the payment service system (or a partner, affiliate, third-party, etc.) may be acting as a non-broker or non-dealer that is providing non-recourse funds to the customer without charging interest and without assuming liability in the unlikely event that settlement of the sale of the security asset fails to complete. Because, on completion of a sale transaction through expedited settlement procedures described herein, the funds may be provided to the user's account (e.g., the user's currency balance) instantly, the user is free and able to use the funds immediately and without restriction. As the payment service system, or partner, affiliate, or third-party of the payment service system, may provide the funds as credit to the user, during the standard settlement period (e.g., two-days) the security assets "sold" by the user are still legally owned by the user. The user's use of the security assets may, in some embodiments, be restricted by the payment service system until the settlement clears.

The embodiments disclosed herein are only examples, and the scope of this disclosure is not limited to them. Particular embodiments may include all, some, or none of the components, elements, features, functions, operations, or steps of the embodiments disclosed above. Embodiments disclosed in the attached claims directed to a method, a storage medium, a system and a computer program product, wherein any feature mentioned in one claim category, e.g., method, may be claimed in another claim category, e.g., system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject matter which may be claimed comprises not only the combination of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

FIG. 1A illustrates an example payment service system network environment 100. Merchant 102 may conduct transactions with customer 104 (or "user 104") for items 106 offered by the merchant 102. FIG. 1A also illustrates a payment service system 108 (also referred to as "payment service"), coupled to merchant point-of-sale (POS) device 105 and customer device 103 via a network 110-1, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g., item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application 107 on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is inserted into the reader, such as chips that comply with the Europay, MasterCard, Visa (EMV) standard, i.e., EMV cards. In other examples, other types of payment instruments include cards or computing devices that communicate via radio frequencies such as radio frequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service system 108 over network 110-1, either substantially contemporaneously with the conducting of the transaction (in the case of online transactions) or later when POS device 105 is in the online mode (as in the case of offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, identity and/or contact information of the customer, and a payment instrument used in the transaction. After conducting an offline transaction with customer 104, POS device 105 may provide the stored information (or some subset of it) to the payment service system 108 over the network 110-1. The network 110-1 may represent any one or more wired or wireless networks, such as a Wi-Fi network, a cellular network, or the like. In an online transaction, POS device 105 may send this information to payment service system 108 over network 110-1 substantially contemporaneously with the transaction with the customer.

After merchant 102 receives the payment information from customer 104, merchant 102 may send respective authorization requests, along with information regarding the respective transactions, to payment service system 108, as illustrated at 114. Payment service system 108 may include payment processing service 126, merchant profiles 130, and customer profiles 132. Here, the merchant profiles 130 may comprise information about one or more merchants using the payment service system 108. The customer profiles 132 may comprise information about one or more customers using the payment service system 108. Each merchant or customer may otherwise be called a user of the payment service system 108. A particular user may be a merchant, a customer, or either depending on the use case.

The payment processing service 126 may receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

When a customer and a merchant enter into an electronic payment transaction, the transaction may be processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110-2 to conduct financial transactions electronically. Payment processing service 126 may also communicate with one or more computing devices of one or more banks, processing/acquiring services, or the like over the network 110-2. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service system 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In transactions involving cryptocurrency, payment service system 108 may communicate over network(s) with one or more cryptocurrency networks. Such networks may include for example, the Bitcoin network, the Ethereum network, etc. Cryptocurrency networks are associated with a network of parties that cryptographically verify and validate transactions and record transactions on copies of a distributed ledger commonly called the blockchain. Once a transaction has been validated, a cryptocurrency network may approve the transaction by writing the transaction to the blockchain. The time for such processes to complete may be impractically long for many applications.

In particular embodiments, the payment service system 108 may communicate over network(s) 110-3 with a source of security assets 145. The source of security assets 145 may comprise a broker of security assets, an exchange for security assets, an issuer of security assets, a security-asset liquidity service, another suitable third-party source, or any combination thereof. The payment service system 108 may acquire ownership interests in security assets by sending one or more purchase orders to the source of security assets 145. In return, the payment service system 108 may receive one or more certificates, tokens, security keys, or other information representing the ownership interest. The payment service system 108 may also sell ownership interests in security assets back to the source of security assets 145. The payment service system 108 may receive fiat currency or another type of asset in return. The payment service system 108 may select particular security assets to acquire from the source 145 and make available to the users. The security assets acquired may be selected based on user demand (e.g., determined based on requests to purchase particular assets). Moreover, internal management of ownership interests in the security assets enables the payment service system 108 to reduce the number of transaction requests to the source of the security assets 145 and thus the overall amount of traffic on network(s) 110-3 compared to prior systems.

Networks 110-1, 110-2, and 110-3 may represent any one or more wired or wireless networks, such as a Wi-Fi network, a cellular network, a wide area network, a local area network, or the like. For the purposes of illustration, networks 110-1, 110-2, and 110-3 are shown as separate networks. In particular embodiments, networks 110-1, 110-2, 110-3 may be the same network, subnets of the same network, one or more separate networks, or other suitable arrangement.

While FIG. 1A illustrates merchants 102 sending the transaction data directly to the payment service system 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective profiles of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) may determine when the customer visits physical premises or a digital presence of the merchant. For instance, the device 103 of the customer 104 may include an application 107 (e.g., an application provided by payment service system 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service system 108 may determine when the customer is present at the merchant in any other number of ways. In each instance, after payment service system 108 receives an indication that customer 104 is located at merchant 102, the payment service system 108 may determine whether to send one or more previously expressed item preferences of the customer to the merchant.

In addition, customer 104 may desire to receive an instance of a payments application 107, such as a mobile wallet application, from the payment service system 108. FIG. 1A illustrates, at 118, that the customer 104 may send payment-application requests to payment service system 108. In response, at 120, payment service system 108 may provide instances of the application 107 back to customer device 103. In addition, payment service system 108 may map an identification of the instance of the application 107 to the customer profile.

According to an implementation of the present subject matter, the customers and merchants may send and receive payments in security assets via the payment service system for purchase of items or a selected set of items. In another implementation, the customers may send payments in security assets via the payment service system, while the payment service system converts a security asset into another asset of the merchant's choice. In another implementation, the customers may designate particular security assets to be sold with the express purpose of putting some or all of the proceeds from the sale towards settling a bill with the merchants.

Figure 1B:
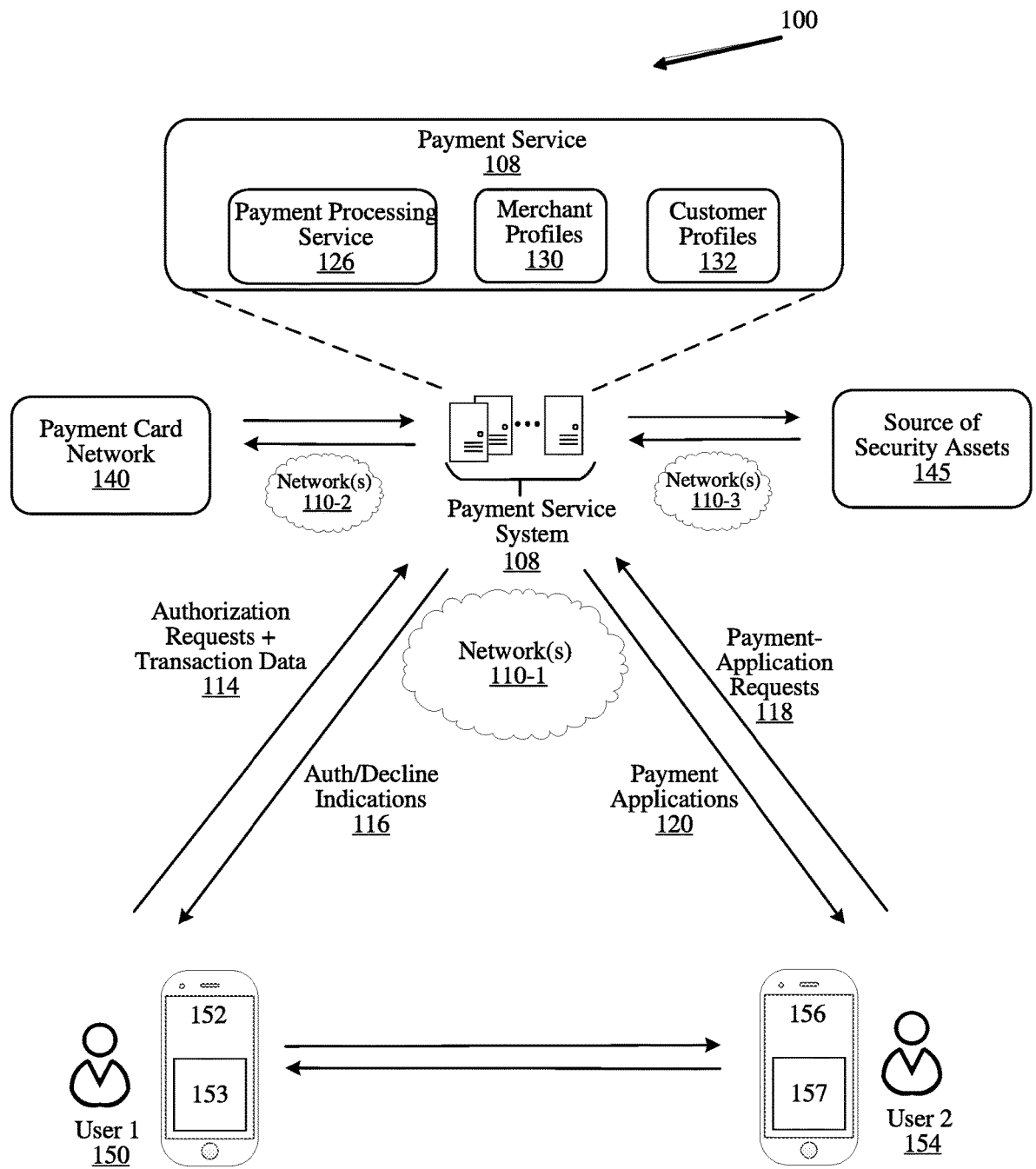

FIG. 1B illustrates another embodiment of example environment 100. FIG. 1B includes many of the same components as the embodiment of example environment 100, except that in FIG. 1B a transaction is between an operating device 152 of a first user 150, and an operating device 156 of a second user 154. For all other components, the descriptions above with respect to at least FIG. 1A apply. Devices 152 and 156 may be a computing device with applications 153 and 157, respectively, provided by payment service system 108 executing thereon. In some embodiments, one or more of the applications 153 and 157 may be point-of-sale applications. In some embodiments, one or more of the applications 153 and 157 may be mobile wallet applications. In some embodiments, one or more of the applications 153 and 157 may be applications provided by a third party capable of accessing at least one payment account.

FIG. 1B illustrates a broader concept—that the present technology contemplates that currency or assets may be sent from any party of any character (merchant, user, bank, etc.) to any other party of any character using the innovations described herein.

In particular, any of the examples described as interactions or transactions between a merchant and a user may be performed between two users 150 and 154. According to an implementation of the present subject matter, the users 150 and 154 may send and receive payments in security assets via the payment service system 108 for purchase of items or a selected set of items. In another implementation, a user 150 may send payments in security assets via the payment service system 108, while the payment service system 108 converts the security asset from the first user 150 into another asset of the second user's 154 choice. In another implementation, the first user 150 may designate particular security assets to be sold with the express purpose of putting some or all of the proceeds from the sale towards settling a bill with the second user 154. In another implementation, the first user 150 may designate particular security assets to be sold with the express purpose of putting some or all of the proceeds from the sale towards providing a loan to the second user 154 through the payment service system. In this implementation, the first user 150 may designate a requested form of repayment (e.g., repayment in a particular currency, the same security asset, one or more other specified security assets, any other security assets, or a mixture of different security assets, types of the security assets, or security assets and currency). The second user 154 may repay the loan provided by the first user 150 through the payment service. The payment service system 108 may facilitate fulfillment of the required form of repayment by automatically converting a payment option provided by the second user 154 (e.g., currency or a designated amount of a security asset) to the designated security required form of repayment. The payment service system allows for a more expansive array of payment options, transactions that are completed more quickly and accurately by reducing the communication and processing times needed for computing systems of various parties to authorize and process the transactions and simplifies the interactions and interfaces that a user must engage with in order to prepare and request the transactions. Taken together, these improvements amount to an overall improvement over previous payment processing systems and related devices. The payment service system therefore includes significant technical advantages and improvements over previous devices.

Figure 2:
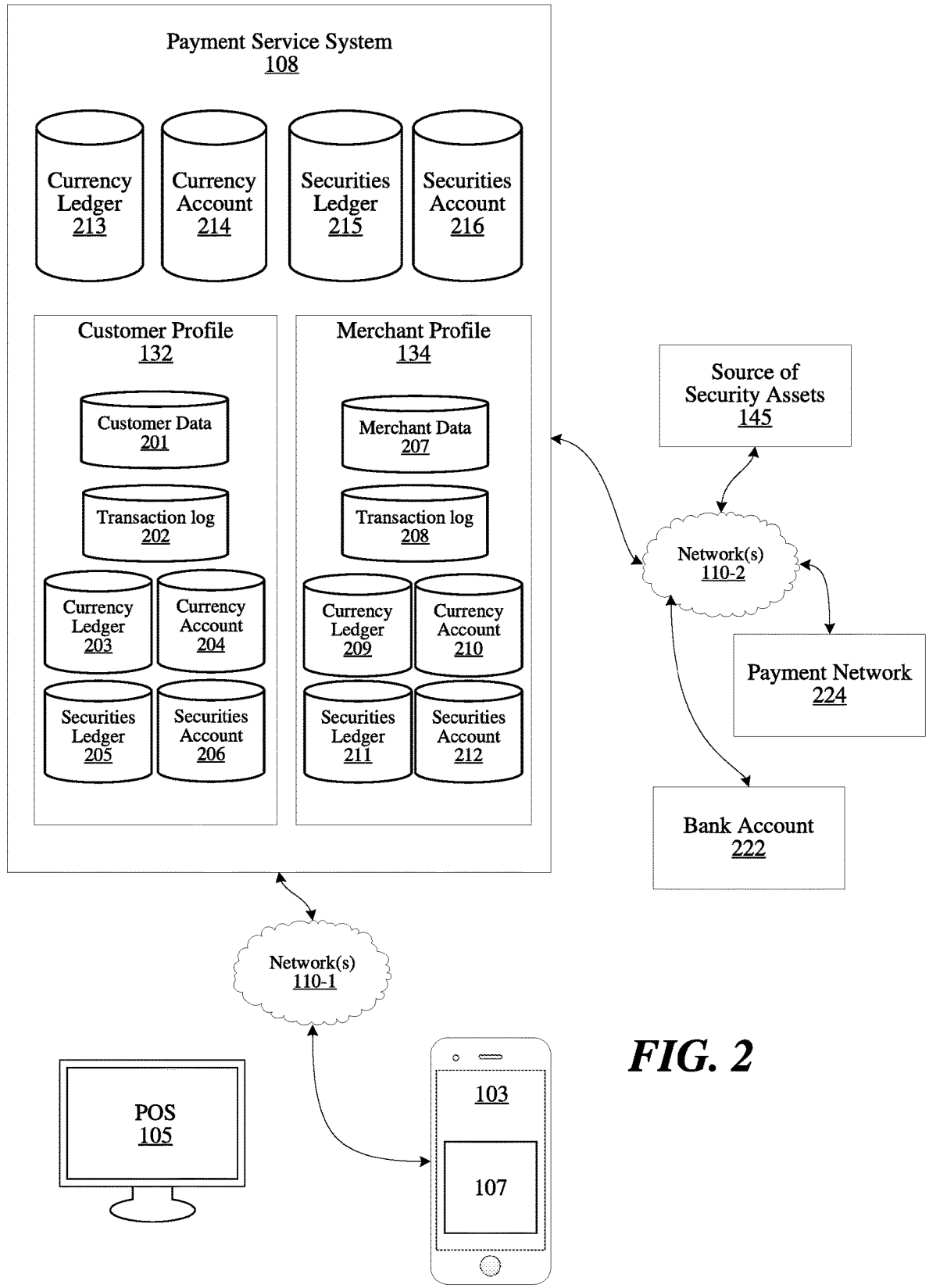
FIG. 2 illustrates an example system architecture for a payment service system.

FIG. 2 illustrates an example system architecture for a payment service system 108. In particular embodiments, the payment service system 108 may store customer profile 132 for each of a plurality of customers. Customer profile 132 may include customer data 201 that may include customer-identifying information (name, contact information, demographical data, etc.), a transaction log 202 including records of past transactions involving payment service system 108 by customer 104, information regarding linked accounts (credit card information, bank account information, etc.), information regarding services utilized by customer profile 132 (e.g., a mobile wallet application). The customer data 201 may further comprise information associated with one or more social or peer-to-peer contacts of a user (e.g., friends, family members, online network connections). The information may comprise at least part of the profile information of such contacts.

The customer profile 132 may also include a ledger for any accounts managed by payment service system 108 on behalf of customer 104. It will be appreciated that customers having accounts managed by the payment service system 108 is an aspect of the technology that enables technical advantages of increased processing speed and improved security. For example, the customer profile 132 may include a currency ledger 203. The currency ledger 203 may store a balance for each of one or more currencies (e.g., US dollar, Euro, bitcoin) that the customer owns. The currency ledger may include information regarding one or more separate accounts of the user that each include currency owned by the customer. The payment service system 132 may also manage or maintain one or more currency accounts 204 on behalf of the user. The currency accounts 204 may include a logical division of currency held by the payment service system 108 that is allocated for the customer's use. The customer profile 132 may also include a securities ledger 205. The securities ledger 205 may store a balance for each of one or more security assets (e.g., stocks, bonds, futures) that the customer owns. The securities ledger may include information regarding one or more separate securities accounts 206 of the user that each include security assets owned by the user. The payment service system 108, or one or more third-parties acting on behalf of the payment service system 108, may manage and maintain the securities accounts 206 for the user. The securities accounts 206 may include a logical division of security assets held by the payment service system 108 that is allocated for the customer's use. The currency ledger 203 and the securities ledger 205 may utilize any suitable data structure. As an example and not by way of limitation, a separate ledger may be used to record information about each individual asset owned by the customer. Various ledgers associated with a particular customer may be stored all together, in groups, or separately. As another example and not by way of limitation, the currency ledger 203 and the securities ledger 205 may be logical ledgers. The associated ledgers may all be saved in a single file, data set, or database. In other words, a customer's ownership interest in a plurality of types of assets (e.g., fiat currency, cryptocurrency, security assets) may all be recorded in a composite ledger or be separately recorded in a plurality of ledgers.

Each account ledger (203, 205) may reflect a positive balance when customer 104 funds the accounts (204, 206). An account may be funded by transferring currency in the form associated with the account from an external account (e.g., transferring a quantity of cash to payment service system 108 and the value is credited as a balance in currency ledger 203), or by purchasing currency in the form associated with the account from the payment service system 108 using currency in a different form (e.g., buying a value of a security asset from payment service system 108 using a value of fiat currency, and crediting the value of the security asset in currency ledger 203), or by conducting a transaction with another user (customer or merchant) of the payment service system 108 wherein the account receives incoming currency. An account may be funded by purchasing security assets via the payment service system 108. When a customer requests to purchase security assets from the payment service system 108, the payment service system 108 may debit a balance stored in the currency account 204 or on the currency ledger 203 and credit a balance stored in the securities account or on the securities ledger 205. In particular embodiments, customer profile 132 may comprise preference settings as to a quantity of security assets to keep. As an example and not by way of limitation, when the payment service system 108 determines a risk index associated with the security assets owned by the customer exceeds a threshold value, the payment service system 108 may automatically cause a sale of security assets for the customer, thus debiting the securities ledger and crediting the currency ledger. As another example and not by way of limitation, the payment service system 108 may automatically cause a purchase of security assets by the user when a balance associated with the securities ledger 205 or securities account 206 drops below a stated level. The customer profile 132 may also comprise preference settings as to a preferred asset for payments (e.g., a preference to use a particular security asset to pay for day-to-day transactions).

Similarly, as introduced with respect to FIGS. 1A and 1B, payment service system 108 may store merchant profile 134. The merchant profile 134 may comprise merchant data 207, transaction log 208, currency ledger 209, currency account 210, securities ledger 211, and securities account 212. The merchant data 207 may comprise one or more preference settings associated with the merchant 102, such as a type of currency or asset that the merchant prefers to receive as payment. The information stored in the merchant profile 134 may be made accessible and managed by a merchant 102 through a POS device 105 or other suitable devices associated with the merchant 102. Operations, including maintenance and management operations, described with respect to the customer profile 132 and information included therein (e.g., the customer data 201, transaction log 202, currency ledger 203, currency account 204, securities ledger 205, and securities account 206) are as much applicable to the merchant profile 134 and the information included therein (e.g., the merchant data 207, transaction log 208, currency ledger 209, currency account 210, securities ledger 211, and securities account 212).

In particular embodiments, the payment service system 108 may acquire security assets from a third-party source 145. The payment service system 108 may directly purchase or sell security assets to one or more sources 145. The payment service system 108 may also enter into contractual relationships with one or more sources 145 such that the sources 145 provide liquidity of security assets to the payment service system 108. The payment service system 108 may maintain a currency ledger 213 recording a quantity of cash or other currencies held by the payment service system 108. The quantity of cash or other currencies held by the payment service system may, for example, be held in one or more currency accounts 214. The payment service system may maintain a securities ledger 215 recording a quantity of security assets held by the payment service system 108. The quantity of securities assets held by the payment service system 108 may, for example, be held in one or more securities accounts 216. The currency ledger 213 and the securities ledger 215 may also specify the portion of the assets held by the payment service system 108 (e.g., through the currency accounts 214 and securities accounts 216) that is owned by one or more users of the payment service system 108 and the portion of the assets that is owned by the payment service system 108. When the payment service system 108 has its own holdings of security assets, customers may acquire security assets directly from the payment service system 108. In particular embodiments, the payment service system 108 may use computational models or algorithms to dynamically and intelligently control buying and selling activities with respect to security assets. The algorithms may be designed for maintaining the security assets owned by the payment service system 108 at a desired level. The desired level may be based on a volume of transactions over a period, balances of collective customer profiles securities ledgers, exchange rates, or trends in prices of security assets. As an example and not by way of limitation, the payment service system 108 may manage its holdings of security assets to minimize the security assets owned by the security service. The payment service system 108 may calculate a projected demand by customers for a particular security asset (e.g., a quantity of the security asset the customers are likely to buy in a particular time period). The payment service system 108 may maintain a level of the security asset just enough to satisfy such a projected demand. As another example and not by way of limitation, the payment service system 108 may dynamically adjust its holdings of security assets based on analysis of market conditions. The payment service system 108 may increase its holdings of security assets having an upward trend in value and decrease its holdings of security assets having a downward trend in value. The intelligent control of security asset holdings as described above along with the use of internal ledgers 213, 215, provides significant technological improvements by enabling the payment service system 108 to reduce the number of transaction requests to sources 145 and thus the overall amount of traffic on network(s) 110-2 when compared to prior solutions.

Furthermore, and in accordance with one example of the concepts disclosed herein, the source of the security assets 145, rather than the payment service system 108, may include a securities account ledger maintained by one or more third-party securities carrying or securities clearing entities (e.g., licensed securities carrying broker and/or licensed securities clearing broker). In this embodiment, the payment service system 108 provides an interface and platform (e.g., introducing broker) for customers to begin the purchase or sale of security-related assets via the submission of a purchase or sale request using the payment application 107 provided by the payment service system. Thereafter, the payment service system 108 may communicate the purchase or sale request via a network (e.g., network 110-2) to the associated third-party entities (e.g., securities carrying entity and/or security clearing entity) to facilitate the sale and transfer and/or assignment of the security asset to the purchasing customer. Based on signals received from the source of the security assets 145 (e.g., securities carrying entity and/or security clearing entity), the payment service system 108 may immediately (e.g., prior to the sale order settling with the clearing broker) advance an amount of funds corresponding to the sale request to the customer, or immediately assign the customer as owner of an amount of the security related assets corresponding to the purchase request.

When two users (e.g., users 150 and 154) engage in a transaction that involves a transfer of assets, such a transaction may be reflected on the ledgers associated with each customer's profile 132. As an example and not by way of limitation, a first user 150 may transfer a quantity of security assets to a second user 154. The payment service system 108 may accordingly debit the securities ledger 205 (and corresponding securities account 206) of the first user 150 and credit the securities ledger 205 (and corresponding securities account 206) of the second user 154.

Additionally, customer 104 may also have one or more external payment cards registered with payment service system 108. The external payment cards may be associated with external bank accounts 222. The external payment card accounts may not be managed by payment service system 108. Instead, an appropriate external payment network 224 may process transactions conducted with payment cards.

Additionally, customer 104 may also have one or more internal payment cards registered with payment service system 108. Internal payment cards may be linked to all accounts associated with customer profile 132. In some embodiments, options with respect to internal payment cards may be adjusted and managed using a payment application 107 installed on the customer device 103. For example, when customer profile 132 includes multiple payment accounts (e.g., cryptocurrency and fiat currency), application 107 may set one of those accounts to be the default account for debits or credits when using an internal payment card.

Customer 104 may access and monitor customer profile 132 including payment cards registered with payment service system 108, currency ledger 203, currency account 204, securities ledger 205, and securities account 206 through the application 107 installed on the customer device 103. The application 107 may be a customer facing application provided by payment service system 108, or that is configured to access customer profile 132 through use of one or more APIs provided by payment service system 108. In some embodiments, application 107 on the customer device 103 may provide digital wallet functionality including storing payment methods and permitting electronic payments by customer device 103 at the instruction of application 107.

In particular embodiments, the payment service system 108 may provide a platform for users to invest in funds, tradeable assets, securities, other assets, or otherwise purchase security assets. The assets may have varying risks, rewards, or maturity levels. The payment service system 108 may receive, from the computing device 103 associated with the customer, a purchase request to purchase a quantity or value of a security asset. The funds used for the investment may be drawn from one or more financial accounts associated with the user that is managed by the payment service system 108 or a third-party system. The payment service system 108 may update a customer balance associated with the customer to increase the value of the security asset in a securities ledger 205 (reflecting an increase in the value of the securities account 206) and to decrease a value of the fiat currency in a currency ledger 203 (reflecting a decrease in the value of the currency account 204) of the customer. The payment service system 108 may also update a service balance associated with the payment service system 108 to decrease a value of the security asset in the securities ledger 215 (and corresponding securities accounts 216) and to increase a value of the fiat currency in the currency ledger 213 (and corresponding currency accounts 214).

The payment service system 108 may receive user settings regarding an entire investment portfolio or one or more individual funds or investment accounts. For example, a user may set a level of risk tolerance on the entire portfolio or on a per-fund basis. The payment service system 108 may recommend one or more packs of financial assets to the user. Alternatively, the user may pick and customize a pack of assets based on considerations such as the user's risk tolerance.

In particular embodiments, when a user desires to sell security assets, the payment service system 108 may be configured to provide the user access to funds equivalent to the value the security assets are worth at the time of sale. The user may be provided information regarding the security assets and the user's holding of the security assets. For example, the user may be shown a user interface of an application 107 that indicates the price paid by the user, a holding class of one or more purchase lots of the security asset (e.g., short term or long term holding), the length of time the security asset has been held, any sale restrictions on the security assets, the current price of the security asset (with price given in any number of scales, such as price per share, price per fractional share, shares per dollar(s)), the market value of the user's holdings of the security asset, a price history for the asset (with price given in any suitable scale), any other information useful to a determination of whether to initiate a sell order, or any suitable combination thereof.

The user may initiate a sell order for the security asset, for example by interacting with a user interface of an application 107. The user may be given the option to determine a quantity of the security asset to sell. In some embodiments, the user may determine to sell some or all of their holdings of the security asset, regardless of whether the holdings (or remaining amount) are fractional shares. For example, the user may determine to sell 4.7 shares of Stock A. In some embodiments, the user may determine to sell fractional shares of the security asset equivalent to a particular dollar amount. For example, the user may determine to sell $100 dollars of Stock A. Based on the most recent market price, the payment service system 108 may determine the number of fractional shares of Stock A that would be equivalent to $100. For example, if Stock A is currently trading at $17.55, the payment service system 108 may determine that 5.7 shares of Stock A should be designated to be sold. The user may approve the amount of security assets to be sold and may be provided a final opportunity to confirm the sale. The user may issue a digital or electronic signature to confirm the transaction. The sell order may then be placed. Receiving a sell order for individual security assets in terms of the value of the security asset, rather than the number of shares of security assets, provides a technological benefit by allowing the payment service system to automatically perform the calculation and correct errors or protect against market changes without further interaction from the user. This in turn allows the process to work more efficiently, as there are reduced requirements for user interaction that may otherwise introduce latency into the process. The payment service system and payment application 107 may function more smoothly through the reduced technical need for user intervention.

When the user places the sell order, the payment service system 108 may communicate with the source of security assets 145 associated with the security asset designated for sale. The payment service system 108 may confirm the price authorized by the user to ensure that no price changes have occurred between the time the user was quoted a particular sale price and the time the sell order was placed (e.g., by transmitting a digital signature). If the price is the same, or if the difference between the current price and the authorized price satisfies a threshold for being substantially the same, the payment service system 108 may initiate the security asset sale. In particular embodiments, the threshold may be expressed in terms of a percentage change (e.g., less than 0.5% difference) or an equivalent value of fiat currency (e.g., less than $0.10). From the user's perspective, once the price is confirmed, the value of their fiat currency account may increase by the value of the security assets sold and the corresponding value of the security asset account may decrease. Marking an improvement over previous systems, the funds may be made available to the user as soon as the sale price is confirmed, or shortly thereafter. Thus, the user may be able to sell security assets to raise fiat currency to pay for a transaction without having to wait for the security asset sale to settle, which may take up to two days or longer under existing systems. This represents a user-experience improvement and also provides opportunities for technological improvements by allowing non-critical back-end processing to occur during off-peak usage times and not precisely when a user expects currency to be made available for their use. The improved user experiences may be manifested in the user interfaces shown to a user and the user interactions required by the user to prepare and process transactions. This allows for improved performance of devices used within the payment service system. Additionally, because of improvements over previous systems accommodating batch, back-end processing during off-peak usage times, the techniques and technologies described herein improve the overall performance and efficiency of the payment service system, including both user-facing and back-end services, by smoothing out the demand on the system.

For example, a user may be shopping for a new couch at a particular merchant. The user may be visiting a physical location or online shopping destination of the merchant. The user may identify a couch they would like to purchase and determine to use funds managed by the payment service system 108 to complete the transaction. However, the user may not have enough cash on hand (e.g., fiat currency in their currency account) to pay for the couch. For example, the couch may cost $1200 and the user may have only $800 in their cash account. The user may own 22.5 shares of Stock A, and the user may be presented a user interface of an application 107 provided by the payment service system 108 that informs the user that the most recent market price for shares of Stock A is $41.75. Thus, the user may be informed that they own shares of Stock A worth approximately $939.37. The user may determine to pay for the couch using part of their cash account and part of their shares of Stock A. However, the merchant may have a policy that they will not accept security assets as payment. In previous systems, the user would have to initiate the sale transaction, wait two or more days for the sale transaction to settle, and then purchase the couch from the merchant. For many reasons, this may be undesirable for the user (the merchant may sell out of the stock, sales or pricing options may be limited time offers, etc.). The user may also be offered financing terms to pay for the couch, but that may be similarly undesirable to the user for a variety of reasons. Using a system like the payment service system 108 described, the user could instead initiate the sale transaction of a portion of their holdings of Stock A, immediately receive the funds from the sale, and purchase the couch using an all-cash offer, complying with the merchant's policies. For example, after being informed of the merchant's policies, the user could determine they would like to use $600 from their cash account and sell shares of Stock A equivalent to $600 to generate the remaining funds to pay for the couch. Using the application 107 provided by the payment service system 108, the user may indicate they would like to sell $600 of Stock A. The user may be informed that, at the current market price of $41.75, $600 will be equal to approximately 14.4 shares, or 64% of their current holdings. The user may confirm the sale of 14.4 shares of Stock A, e.g., through issuing a digital signature, receive the $601.20 generated by the sale, and pay for the couch using the proceeds of the sale mixed with funds in their cash account with minimal delay. The payment service system 108 may therefore simulate a security trading environment in which the apparent settlement delay is measured in seconds, as opposed to days.

On the backend of the payment service system 108, the payment service system 108 may take multiple steps to facilitate this "expedited settlement" security asset market for the user. After receiving confirmation for the price of the security asset from the source of security assets 145, the payment service system 108 may decrease the value associated with the asset to be sold in a securities ledger 205 associated with the customer. The payment service system 108 may increase the value associated with the asset associated with the securities ledger 215 associated with the payment service system 108 (e.g., reflecting a change in the securities account 216). At the same time, the payment service system 108 may increase the currency ledger 203 associated with the customer by the confirmed total sale price of the security asset, reflecting a deposit made to the corresponding currency account 204. The payment service system 108 may also decrease the currency ledger 213 associated with the payment service system 108 by the same amount (e.g., reflecting a change in the value of the currency accounts 214). Thus, the payment service system 108 may transfer the security asset to the payment service system 108 and the corresponding value in currency to the customer's account as an advance of an anticipated sale price of the security asset. Because the security assets are all held by the payment service system 108 for the benefit of the customer, this can be done without delay. The ability to "advance" funds to a user represents a significant improvement over previous systems that rely on transactions to settle (e.g., with a securities exchange system) before the transfer to the customer. Additionally, because the way the transaction is processed by the system may be comparatively simpler than processing a transaction that communicates (often multiple times) with a third-party system, the efficiency and performance of the payment service system is improved. These improvements include both back-end system-wide performance and efficiency improvements and also improvements in user-focused systems. For example, devices executing a mobile application (e.g., application 103) of the payment service system 108 may perform more efficiently and may be perceived by the user to perform more quickly because they may not be required to wait as much on extensive communications with other systems.

In particular embodiments, the payment service system 108 may compute an estimated duration of time required for settlement of a transaction based on information provided in the request. For example, if the type of transaction is subject to a higher level of scrutiny, due to the class or volume of assets involved or the identity of the user requesting the transaction, then the transaction may take longer than other similar transactions. The level of scrutiny may be determined based on regulatory or other legal requirements, policies, or user preferences. The user may be identified as a corporate insider, officer, director, employee, or large shareholder. In another example, if the type of transaction exceeds a threshold level of complexity, due to the class or volume of assets involved or the identity of the user requesting the transaction, then the transaction may take longer than other similar transactions. If the estimated duration of time is below a threshold duration (e.g., 2 hours or 24 hours), the payment service system 108 may initiate a typical transaction with the securities exchange system or another third party to sell the amount of the security asset specified in the request. If the estimated duration of time is not below the threshold duration, then the payment service system 108 may proceed with expedited settlement.

Meanwhile, the payment service system 108 may determine whether some or all of the security assets newly credited to the payment service system 108 should be sold. For example, the payment service system 108 may have one or more thresholds for determining when security assets should be sold to replenish reserves of currency on hand. For example, if the value associated with the currency ledger falls below a threshold value, the payment service system 108 may determine to sell one or more security assets owned by the payment service system 108 in the securities account 216 and credited to the payment service system 108 in the securities ledger 215. As another example, the payment service system 108 may be configured to keep only a certain number of security assets above the total number of security assets held for the benefit of customers of the payment service system 108. For example, for a given security asset, Stock B, the payment service system 108 may be configured to keep one share beyond the total number held for the benefit of customers. Three customers may each have holdings of 0.75 shares, totaling 2.25 shares. The payment service system 108 would therefore hold 4.0 shares, 2.25 held for benefit of customers, and 1.75 held for the payment service system 108. If one customer seeks to sell 0.5 shares, the payment service system 108 would adjust the respective securities ledgers, so that the customer owns 0.25 shares, bringing the customer total to 1.75 shares, and the payment service system owns 2.25 shares. The payment service system would therefore sell 1 share of Stock B, based on the per-share holding limits. The number of shares held for each customer would be unchanged, but the payment service system would only be managing 3 shares (holding 1.25 for the payment service system 108). These determinations may be performed automatically and after the user has determined to sell the shares of the security assets.

If the payment service system 108 determines to sell some of the security assets sold by a customer (e.g., to buy a couch as in the previous example), it may use conventional sources of security assets 145 to do so. Those exchanges may be limited to settle transactions at a typical rate (e.g., with a two-day delay). Once the transaction settles, and the funds from the transaction are deposit to the currency account 214 of the payment service system 108, the payment service system 108 may mark the proceeds of the sale on the currency ledger 213 of the payment service system 108, effectively reimbursing itself for the advance paid, or credit provided, to the customer for the anticipated sale of the security assets. With this system, users of the payment service system 108 can interact with a security asset market as though it has no sale delay, even if it has a built-in hours-long, or greater, delay. Thus, the architecture as described herein is a technological improvement in the technological interfaces between users and traditional securities markets.

In particular embodiments, the payment service system 108 may be configured to pause expedited settlement transactions for one or more customers of the payment service system 108. The payment service system 108 may be configured to detect erratic or suspicious security asset seller behavior and pause expedited settlement (e.g., revert to a timeline dependent on the security asset provider 145). For example, a user may own shares of a security asset and initiate a sale. The payment service system 108 may credit the user for the sale. The resulting value stored in the respective security asset ledgers and currency ledgers may trigger a sale of security assets by the payment service system 108. The user may then seek to purchase shares of the same security asset. The payment service system 108 may transfer credit, or arrange for the transfer of credit, of the shares to the user, causing the amount owned by the payment service system 108 to fall below a threshold, triggering purchase of additional shares. The user may engage in behavior such as this repeatedly and/or over a short period of time (e.g., multiple times per hour or minute). Because such behavior may cause significant tax disadvantages for the user and for the operator of the payment service system 108, the payment service system 108 may pause expedited settlement for the user, meaning that they will not have access to funds to continue to cycle purchases. Similarly, multiple users may trigger a similar situation, purposefully or accidentally, and the payment service system 108 may temporarily pause expedited settlement. The payment service system 108 may alert users of the payment service system 108 of the pause (e.g., through an email or push notification) to reduce user confusion and reliance on the expedited settlement. The payment service system 108 may also pause expedited settlement to prevent abuse of the feature or violation of one or more policies of the payment service system 108. For example, the payment service system 108 may have a policy against day trading security assets using the system. One way to prevent day trading may be to pause expedited settlement for users who are suspected of violating this policy. Thus, the user's funds will still be available to them within the normal time of most security asset providers and managers, but they will not be available instantly. The described operations may be viewed as safeguards of the payment service system that financially protect the system and users, however, these same safeguards have technical effects as well. For example, by restricting the number of transactions that may occur through the payment service system over a given period of time, the payment service system effectively manages the bandwidth of the system. This safeguards the overall performance of the system by ensuring that the system is not unduly slowed down by accidental or intentional misuse of the system. The performance effects are demonstrated in processing utilization and efficiency of computing systems of the payment service system. Therefore, the payment service system embodies technical improvements over previous systems that may be subject to such misuse.

In particular embodiments, the actual settlement of sales of the security assets may be performed in batches, aggregating all sales and purchase of users over the course of a previous trading period (e.g., day, hour, etc.). The payment service system 108 may aggregate all user transactions by settling the ledgers of the accounts and only initiate the actual sale of security assets (e.g., transact with the source of security assets 145) when the ledger-affecting transactions are completed. Such a system of batched transactions may provide myriad benefits to users including reduced transaction wait times, processing fees, and uncertainty. The batched system is also a marked technological improvement over other on-demand or real-time trading systems by balancing utilization, and thus efficiency, throughout the day (or other period of time), rather than just on-demand.

Figure 3:
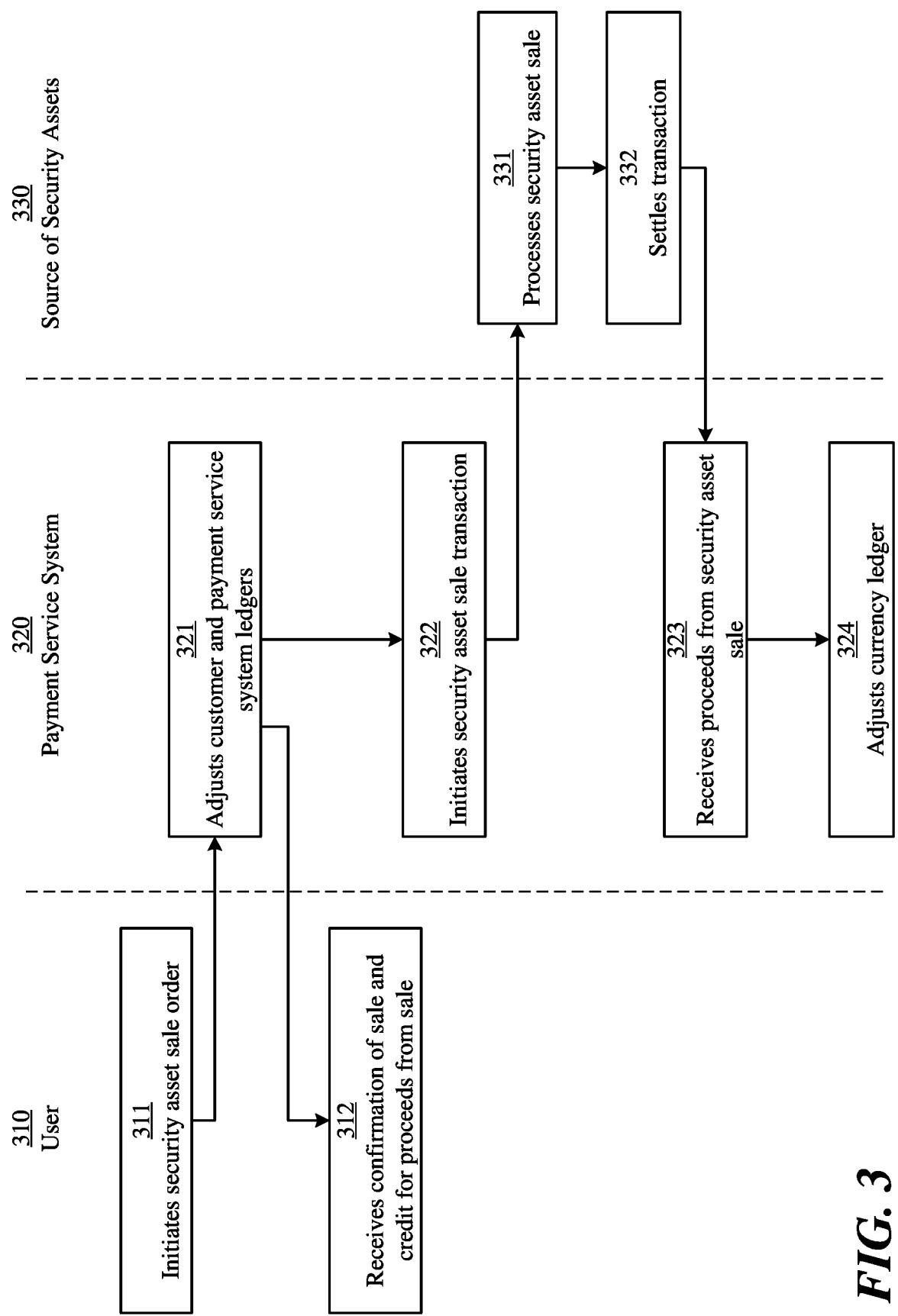
FIG. 3 illustrates a process for providing settlement of security asset transactions.

FIG. 3 illustrates the interactions between various actors, including the payment service system 320, a user, 310, and a source of security assets 330, in a process for using and providing expedited settlement of security assets. In reviewing FIG. 3, the process generally advances as the blocks representing steps of the process proceed from the top of the figure downward so that, even if an arrow does not connect blocks, a first block (e.g., the block for step 312) above a second block (e.g., the block for step 322) will generally occur first in the process. The process may begin at step 311, in which a user 310 may decide to sell security assets and initiate a security asset sale order. For example, the user may issue the sale order with a digital signature to the payment service system 320 using an application 107 provided by a payment service system 108. The user's digital signature may be supplied after receiving a price quote. The sale order may be sent to the payment service system 320. The payment service system 320 may receive the sale order and in step 321 adjust ledgers associated with the payment service system and the user accordingly. In some embodiments, the payment service system 108 may adjust the ledgers prior to the security asset transaction settling with a clearing broker or securities exchange system. In particular embodiments, the payment service system 320 may decrease the security asset ledger associated with the user 310 in accordance with the value of the security assets sold (e.g., the number of shares). The payment service system 320 may increase the security asset ledger associated with the payment service system 320 in accordance with the value of the security assets sold. Simultaneously, the payment service system 320 may increase the value of the currency ledger associated with the user 310 in accordance with the value of the security assets sold and the payment service system 320 may decrease the value of the currency ledger associated with the payment service system 320 in accordance with the value of the security assets sold. The payment service system 320 may send confirmation of the completion of the sale to the user 310. At step 312 the user may receive the confirmation of the sale and receive immediate access to the funds from the sale. As these funds are added to the user's currency ledger, these funds serve as deposited funds and are immediately available (i.e., prior to the sale settling with the source of the security asset 145) for use in any type of future transaction (e.g., purchase at an online or offline merchant).

At a time after the user has received confirmation of the sale and access to the funds associated with the sale, at step 322 the payment service system 320 may initiate a security asset sale transaction to regain funds in reimbursement for the credit and deposit given to the user 310 for the sale. The payment service system 320 may send details regarding the transaction to the source of security assets 330. Example sources of security assets 330 include a clearing broker or a securities exchange system. The source of security assets 330 may receive the details of the sale, and at step 331 may process the security asset sale on the market (e.g., listing the security assets for sale). Later, at step 332, the source of security assets 330 may settle the transaction and receive funds from the proceeds of the sale. The source of security assets 330 may send the proceeds to the payment service system 320. At step 323, the payment service system 320 may receive the proceeds from the security asset sale. At step 324, the payment service system may adjust the currency ledger associated with the payment service system 320 in accordance with the value of the proceeds received from the security asset sale. The process described above, through which a user may have immediate access to proceeds of a sale prior to settlement of the transaction with a securities exchange system represent a significant improvement over previous systems. The process further enables significant new interactions between the user, the payment service system, and other users of the payment service system as described throughout.

Figures 4E, 4F:
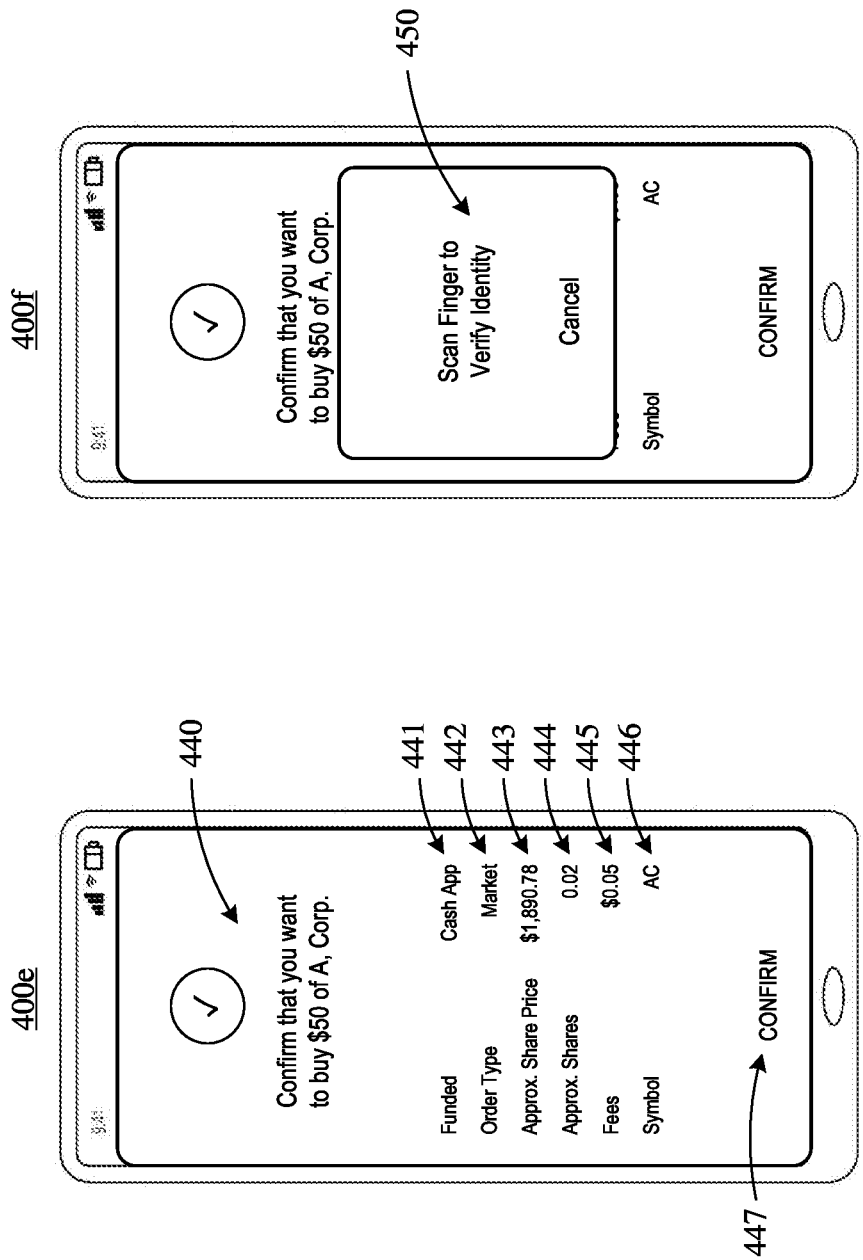
Figure 4H:
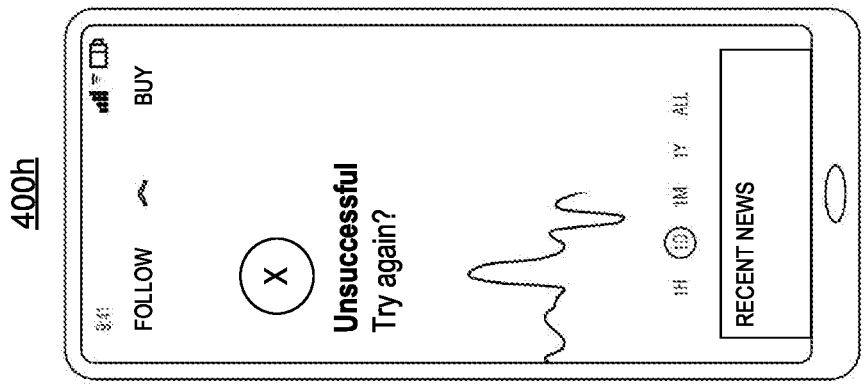

FIGS. 4A-4F illustrate example user interfaces for purchasing security assets using an example mobile application 107 associated with a payment service system 108. Similar interfaces with minor modifications may also be used to allow a user to sell security assets using the example mobile application 107 (e.g., substituting graphics relating to purchasing assets with graphics relating to selling assets). The mobile application 107 may provide functionalities for a user to buy, sell, and manage security assets. As illustrated by FIG. 4A, such functionalities may be provided in the user interface 400a. The user interface 400a may comprise a "INVEST" button 411 directing the user to an interface for purchasing security assets and a "CASH" button 412 directing the user to an interface for managing one or more fiat currencies and one or more financial accounts. The user interface 400a may also comprise a data field 413 summarizing a total value of security assets owned by the user and a change in the value (e.g., percentage and monetary value) in a particular period of time. The user interface may comprise a chart field 414 visualizing the fluctuation of the value of the security assets owned by the user. At time period field 415, a user may select a relevant time period for the securities value chart 414. The user interface 400a may comprise fields 416a-c listing the user's ownership of assets. For example, field 416a may display information about bitcoin owned by the user; field 416b may display information about shares of S, Inc. owned by the user; field 416c may display information about shares of A Corp. owned by the user. The user may interact with one of the fields 416a-c to review more detailed information about a particular asset. For example, the user may click on the field 416c to be transferred to the user interface 400b shown in FIG. 4B.

The user interface 400b shown in FIG. 4B displays detailed information about shares of A, Corp. A price chart field 423 may visualize the fluctuation in the value of A, Corp. shares during a period set in field 425. A percentage change field 421 may recite the percentage change of the value of A, Corp. shares during the same period. The user interface 400b may comprise a "BUY" button 426 allowing the user to buy A, Corp. shares. The user interface 400b may comprise a "FOLLOW" button 427 allowing the user to add A, Corp. to a followed-companies list from which the user may more easily keep track of the price of A, Corp. shares. After the user interacts with the "BUY" button 426, an application 107 providing the user interface 400b may further provide for display to the user various options related to buy orders (e.g., market, limit, stop loss) and may allow the user to specify various parameters of the order (e.g., number of shares, value of cash to be spent). The user interface 400b may further include a "Recent News" pop-up 422 allowing the user to see new regarding A, Corp. In particular embodiments, if the user already owns a number of shares of A, Corp., the detailed information screen in the user interface 400b may comprise a field showing a total value of A, Corp. shares owned by the user, a change in value, or a total number of shares owned. The "FOLLOW" button 427 may be replaced by a "SELL" button, allowing the user to sell A, Corp. shares.

The mobile device may switch to the user interface 400c shown in FIG. 4C if the user interacts with the "BUY" button. In this user interface 400c, a pop-up section is displayed comprising information and interactive elements relevant to purchasing A, Corp. shares. The pop-up section may comprise a field 431 specifying the company whose shares are to be purchased and a value selector field 432 using which the user may specify the amount of money to invest. The value selector field 432 may comprise a plurality of option selectors 433a-433e. As illustrated in FIG. 4C, the option selectors 433a-433e may increase in the amount of money represented. Selecting the option selector may cause the indicated amount of money to be selected for a purchase order. As illustrated in FIG. 4C, option selector 433a represents a purchase order for $1 worth of A, Corp. shares. Option selector 433b represents a purchase order for $5 worth of A, Corp. shares. Option selector 433c represents a purchase order for $10 worth of A, Corp. shares. Option selector 433d represents a purchase order for $25 worth of A, Corp. shares. Option selector 433e represents a purchase order for $50 worth of A, Corp. shares. One option selector, in the illustrated example option selector 433e may be designated as a "default" or "recommended" purchase amount. As discussed in detail below, in particular embodiments, the values associated with the option selectors 433a-433e, as well as which option selector is specially designated, may be determined dynamically, adjusted based on, for example, the selected company, the user, or a variety of other factors. Although the user interface 400c illustrated in FIG. 4C includes five option selectors, more or fewer option selectors may be used in the user interface 400c as appropriate. The user interface 400c may further comprise a button 435, which the user may interact with to execute the purchase. The user interface as described, with dynamically selected purchase values for shares of particular security assets represents a technological improvement over other systems allowing a user to purchase shares of a security asset in many significant ways including in reducing the number of user interactions associated with making the purchase. By reducing the number of interactions, the payment application 107 may process more quickly and efficiently, providing a more efficient user interface. The described system may further allow for the payment service system to predict and pre-cache purchases by the user. The system may pre-emptively calculate the effects of any purchases based on the predictions and may be able to display the effects more rapidly than in a purely responsive system. The system may be enabled to provide purchases more quickly than prior solutions by acting on anticipated actions prior to the user actually engaging them, for example by pre-authorizing transactions based on predicted behavior and pre-generating results in one or more ledgers maintained by the payment service system. This again improves the overall efficiency of the payment service system and associated payment applications 107 through simplified user interfaces and reduced on-demand computations.

In particular embodiments, the pricing options selected to be included in the value selector field 432 (e.g., the values associated with the option selectors 433a-433e) may be dynamically selected based on information accessed by the payment service system 108 or the mobile application 107 provided by the payment service system 108. In some embodiments, the pricing options may be based on information about the user available to the payment service system 108. The payment service system 108 may personalize the pricing options for the user based, at least in part on a calculation of a likelihood that the user will select the pricing options. By dynamically adjusting the values associated with the option selectors, the payment service system 108 may facilitate faster, easier security asset purchases, while conveying useful information to the user. For example, a user may not need to cross-reference the amount of fiat currency available to them, as the values selected for the option selectors may be configured to never exceed a predetermined (or pre-selected by the user) threshold value. These streamlined interactions have tangible positive effects on the systems and devices used, as the simplified interfaces and reduced interactions may enable more efficient approaches to presenting those interfaces.

The payment service system may consider the balance of a user's primary account or an account often used to provide funds to purchase security assets (e.g., the value of the currency ledger 203 or currency account 204 associated with the user) and may adjust the options presented to the user accordingly. In particular embodiments, the values of the option selectors may be chosen as a percentage of the amount of money in the user's primary account, optionally rounded to a suitable value. For example, the values for five option selectors may comprise 10%, 15%, 25%, 40%, and 50% of the value of the user's primary account, rounded to the nearest $50 increment. In particular embodiments, the payment service system 108 may determine that a user regularly makes security asset purchases within a narrower range of their account balance. For example, the payment service system 108 may determine that the user only makes security asset purchases worth 40-50% of the value of their primary account. The payment service system 108 may set the values for the option selectors to values based on that range and the user's current account balance. For example, if the user has $1000 in their primary account, the values associated with five option selectors may be set to $300, $400, $450, $500, and $600.

The payment service system 108 may consider user account balance patterns and adjust the values for the option selectors accordingly. In addition to considering the account balance, the payment service system 108 may analyze the change in account balance over time. For example, the payment service system 108 may determine that a user receives an influx of payments on a semimonthly basis (e.g., as income). If the user has recently received such a payment, the payment service system may increase the values of options presented to the user, even to values greater than would be shown by just looking at the user's account balance. Similarly, the payment service system 108 may recognize that that the value of the user's account balance has recently increased dramatically (e.g., as a result of a year-end bonus). The payment service system 108 may greatly increase the value of options presented to the user.

The payment service system 108 may consider the user's security asset purchase history when choosing the values for the option selectors. The payment service system 108 may record each security asset purchase made by a user in a security asset transaction log and may analyze the log to determine patterns in the user's purchase history. The payment service system may consider repeated purchases of the same security asset. For example, a user may purchase the same value of a particular security asset on a regular basis, or, if the purchase isn't made frequently, may purchase the same value of the asset when they do decide to make a purchase. The payment service system 108 may consider purchases of security assets associated with the same type of company or sector of the economy. For example, a user may frequently purchase assets of technology companies and energy companies but purchase more value of the technology company assets they purchase than energy company assets. The payment service system may determine to recommend higher purchase amounts for technology company assets than energy company assets. The payment service system 108 may determine long-term trends in the user's purchase history. For example, the system may determine that the user has been steadily purchasing larger values of security assets over time and may recommend default values for the user considering this observation.

The payment service system 108 may record the user's interactions with the value selector field 432 and options selectors 433*a-e*. As the option selectors 433*a*-433*e* may each be associated with category of purchase size, the payment service system may be able to determine an investor category for the user. The values presented for each option selector may be categorized ranging from small or micro purchases, to very large or stretch purchases, with the middle value being a default or recommended purchase size. As the user selects purchase sizes, patterns regarding the category of purchase size made may be used to adjust the values chosen for option selectors in the future. For example, if a user tends to favor purchases larger than the default size, the system may slightly increase the value of the default size for option selection fields in the future. Similarly, if a user routinely selects the smallest purchase size option, the system may greatly decrease the value of the default size for option selection fields in the figure. The goal of the dynamic system may be to arrive at a convergence point where the user regularly selects the default purchase size amount, likely due to the system accurately learning the investment size preferences of the user, divorced from the share price of any particular security asset. When the system is able to accurately predict the preferences of the user, systems processing and presenting the information can demonstrate performance and efficiency improvements by streamlining the interactions required to engage in the noted transactions. The systems may also have simplified requirements relating to communication between and among the systems involved. Thus, while the techniques described herein have benefits to users (in that they may save time and decision-making energy), they may have tangible, technical benefits to the systems used.

The payment service system 108 may consider a user's transaction history with the payment service system when choosing the values for the option selectors. The payment service system 108 may determine that a user is a regular customer of certain companies and augment the values of purchase options presented to the user based on detected patterns of behavior. For example, analyzing the transaction log 202 associated with the user, the payment service system 108 may determine that a user is a regular customer of a clothing company F, Inc. The user may have decided to buy shares of F, Inc. The payment service system may increase the value of the purchase size options shown to the user in the value selector field 432 based on the assumption that, because the user is a regular customer of the company, they would want to own a larger value of shares in F, Inc.

The payment service system 108 may consider demographic information retrieved from a customer data store 201 associated with the user. The payment service system 108 may compare security asset purchase behavior of other users with similar demographic information to determine values for the option selectors. The payment service system may compare demographic information such as age, nationality, country of origin, employment status, education level, home ownership, residence location, household income, marital status, gender, income level, any other suitable demographic information, or any combination thereof. When a user determines to buy a particular security asset, the payment service system 108 may reference other users who have purchased the same asset and analyze demographic information of those users. The payment service system 108 may adjust the value of options to present to the user based on insights from the analysis. For example, a user may seek to purchase shares of A, Corp. The payment service system may identify other users who have purchased shares of A, Corp. and gather demographic information for those users. The payment service system may determine that other users with a similar level of income, education level, and age range purchase $250 worth of shares of A, Corp. when they make purchases. If this is the user's first purchase of shares of A, Corp., the payment service system 108 may set the default purchase option to $250 and set the remaining options accordingly. If this is not the user's first purchase of shares of A, Corp., the system may consider the user's individual purchase history and the purchase history of the demographically similar users. The user's previous purchases may have averaged to $200 per purchase. The system may set the default option to $225 based on the user's past purchases and the fact that the average purchase of demographically similar users is $250.

The payment service system may consider a social network of the user when determining values for the option selectors. The payment service system 108 may access a social network service and retrieve a list of connections of the user on the social network service that also use the payment service system 108. The payment service system may analyze the security asset purchasing behavior of the connected users when setting values for the option selectors. In particular embodiments, the payment service system 108 may consider the value of the same, or related security assets, held by the user on the intuition that a user may wish to own a similar value of shares as their connections. The payment service system 108 may consider the typical purchase size of the connected users of the same asset, similar assets, or assets independent of type or classification. The payment service system 108 may convey approximate, averaged, or summarized ownership value or purchase sizes of the user's connections, based in part on privacy settings of the users.

The payment service system may consider the price per share of the selected security asset and adjust the options presented to the user accordingly. In particular embodiments, for security asset prices above a threshold price, the payment service system 108 may select values of the option selectors corresponding to percentages of the price of the security asset. For high value assets, the values for the option selectors may correspond to a range including a portion of one or more shares of the asset. Example ranges may include 25-75%, 50-150%, or 25-175% the price of a single share. For example, the most recent share price of a company, A Corp. may be $675, and the values chosen for five option selectors may be $168.75, $236.25, $337.50, $438.75, and $506.25 (corresponding to 25%, 35%, 50%, 65%, and 75% of the share price, respectively). The values may optionally be rounded as appropriate, e.g., the values chosen for five option selectors may be $175, $225, $350, $450, and $500. For lower value assets, the values for the option selectors may correspond to a range including a plurality of shares of the asset. Example ranges may include 100-500%, 100-1000%, or 200-2000% as appropriate. In particular embodiments, the payment service system may consider other parameters relating to the price per share of the selected security assets. For example, the payment service system may consider projected yield of the security asset based on one or more predictive metrics that may be selected by the user. Additionally, as the techniques described herein may apply to a "sale" interface of the application, the payment service system may select the values of the option selectors based on the yield calculated from the user's current holdings and one or more purchase lots.

The final options for values associated with the option selectors may be based on a weighted combination of values proposed or prompted by any of the above factors. The weights associated with any individual factor may be adjusted dynamically by the payment service system 108 based on a perceived success rate, where success is measured as a successful prediction of the purchase amount selected by the user. Additionally, the values chosen for the option selectors may be selected to follow specific rules regardless of the identity of the user or the security asset. The values chosen for the option selectors may have a required minimum purchase size (e.g., $1). The values may also be rounded to the nearest dollar, five dollars, ten dollars, etc. The values may be truncated or rounded up. In particular embodiments, the options for values of the option selectors may be determined based further on a maximum permissible expenditure. For example, the high end of any option range presented to the user may not exceed a threshold percentage (e.g., 80%) of the user's available currency, or may be capped based on a transaction limit enforced by the operator of the payment service system 108 or a source of security assets 145.

If the user interacts with the button 434, the mobile device may display the user interface 400d shown in FIG. 4D, which comprises a keypad 437 to allow the user to enter in an exact amount for the value of A, Corp. shares to be purchased. The amount is shown as the user types in the field 436. The user may interact with the button 435 to execute the purchase.

After the user interacts with the button 435, from either user interface 400c or 400d, the mobile device may display the user interface 400e shown in FIG. 4E, which comprises a confirmation pop-up summarizing the information associated with the planned transaction. A text field 440 states the purpose of the confirmation, which in this example is to confirm that the user wishes to purchase $50 worth of shares of A, Corp. A field 441 indicates that this transaction will be funded from the currency account managed by the payment service system 108. In other scenarios, the transaction may be funded from an external account, bank account, or other payment account associated with the user. A text field 442 indicates the Order Type of this transaction, which in this case is on the market. In other scenarios, the transaction may be private, person-to-person, or person-to-institution transaction. A text field 443 indicates the approximate price of a single share of A, Corp. at the time the transaction was requested. A text field 444 indicates the approximate number of shares that will be owned by the user after the transaction. This text field 444 indicates the fractional nature of the user's share ownership and illustrates the value added to the user by the fractional share system. A text field 445 indicates the value of any fees assessed as a result of the transaction. A text field 446 indicates the stock ticker associated with A, Corp. "AC". The user may confirm that the information associated with the transaction is correct and cause the transaction to proceed by interacting with the button 447.

If the user interacts with the button 447, the mobile device may display the user interface 400*f* shown in FIG. 4F which comprises a security confirmation pop-up 450. The pop-up may comprise an identity confirmation associated with the user's account. For example, the user may have assigned a back-up authentication when creating their account which should be satisfied before any financial transactions are permitted. For example, the pop-up 450 may comprise a two-factor authentication (2FA) check using hardware or software devices, the pop-up may comprise a biometric identity check such as fingerprint scan, face recognition, iris scan, voice confirmation, or any other suitable biometric identity check. The pop-up may comprise a password reconfirmation in which the user must re-enter a password, personal identification number (PIN), or personal security question. If the user satisfies the identity confirmation, the mobile device may send the purchase order information to the payment service system 108 which may in turn order the transaction with the security asset source 145 on behalf of the user. In particular embodiments, the successful completion of the identity confirmation may act a digital signature for the user.

Figure 4G:
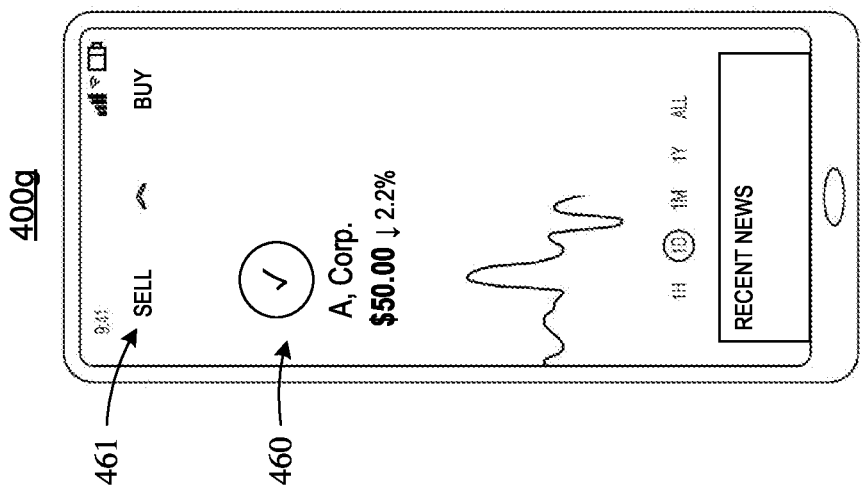

If the transaction is successful (e.g., if the security assets are able to be purchased for the user at the specified price), the mobile device may display user interface 400*g* shown in FIG. 4G. The user interface may include an indication of the successful transaction 460. User interface 400*g* may be similar to the user interface 400*b*, updated to include the value of shares of A, Corp. owned by the user after the successful transaction. As shown in FIG. 4G, if the user previously did not own any shares of A, Corp., user interface 400*g* may include a "SELL" button 461, which may allow the user to sell shares of A, Corp. In particular embodiments, similar techniques to those described above for generating and presenting values for purchase amounts of security assets may be used to generate and present values for sale amounts of security assets. Additionally, other rules for sale amounts may be used relating to ensuring that a user has a minimum value of security assets (e.g., if the user's balance is below a threshold amount, recommending the user sell all their holdings) or that values within a certain ranged have fixed sale amount suggestions (e.g., for security holdings between $5 and $100, the amounts are fixed to 10%, 30%, 50%, 70%, and 100% of holdings). These rules are merely examples and other suitable rules may also be used.

If, for any reason, the transaction fails after the user interacts with the button 447, the mobile device may display user interface 400*h* shown in FIG. 4I1. The user interface 400*h* includes a notification that the transaction was unsuccessful and inquires whether the user would like to try again. In particular embodiments, the user interface 400*h* may include a description for why the transaction failed and suggest one or more potential remedies. In particular embodiments, the transaction may fail because the user failed to satisfy the identity confirmation prompted by user interface 400*f* The user interface 400*h* may notify the user that the identity confirmation failed and encourage them to try again. In particular embodiments, the transaction may fail because the user device lost internet connectivity after the user confirmed the transaction by interacting with the button 447 or after the user satisfied the identify confirmation. The user interface 400*h* may notify the user of this failure state, encourage them to find a more secure interface connection, and try again.

FIGS. 5A-5F illustrate example user interface associated with researching and purchasing groups of security assets. In particular embodiments, the payment service system 108 may facilitate users to invest in groups or packs of security assets. The payment service system 108 may send, to a client device associated with a user, instructions to display one or more recommendations of packs of security assets. Each pack may comprise a plurality of security assets. The security assets included in a pack may be based on a determined or predicted level of interest in the security assets of the pack of the user of the payment service system 108. The level of interest may be based on explicitly stated preferences or may be inferred based on user activity or information available to the payment service system about the user. As described below, the determined level of interest may be based on a variety of individual and related factors. The security assets for a particular pack may be identified based on one or more criteria such as industry, stage of growth, risk management, diversity, other suitable criteria, or any combination thereof. The security assets for a particular pack may at first be chosen based on these factors that are not necessarily directly related to the user. In other words, the particular security assets chosen for a particular pack may be generic or common to multiple users of the payment service system 108. The security assets for a particular pack may be customized for the particular user based on a variety of factors including, but not limited to, demographic information associated with the user, the user's transaction history, the user's security asset purchase history, or the user's geographic location. The security assets for the particular pack may be adjusted from a generic or commonly recommended pack to customize the pack for the user. Providing customized security asset pack recommendations, particular to an individual user based on interests and/or purchase behavior of the user or other users having a similar purchase profile, may enable significant technological improvements to the payments service system 108 and related applications 107. For example, in response to prepared recommendations, the payment service system may pre-emptively generate and pre-authorize security asset purchases and/or purchase requests and the effects of said purchases, including assets related to the purchase and related calculations. The prepared recommendations may also allow for users to make security asset pack purchases in a more streamlined fashion, reducing the amount of user interactions required to complete the process of purchasing a group of security assets in one transaction. The reduced number of interactions may facilitate overall more efficient and better-prioritized operation of the payment service system 108 and application 107. The system may be further enabled to provide purchases more quickly than prior solutions by acting on anticipated actions prior to the user actually engaging them, for example by pre-authorizing transactions based on predicted behavior and pre-generating results in one or more ledgers maintained by the payment service system.

In particular embodiments, the payment service system 108 may facilitate users to invest in groups or packs of security assets. The payment service system 108 may send, to a computing device 103 associated with a user, information to display a suggestion of a security pack to invest in. The security pack may comprise a plurality of different security assets, each corresponding to a weight. The payment service system 108 may receive, from the computing device 103 associated with the customer, a purchase request to purchase a quantity of the security pack. In response, the payment service system 108 may update the value of the fiat currency and a value of each of the plurality of security assets in the customer balance based on the amount of the security pack and the weight of each of the security assets. The payment service system 108 may also update the value of the fiat currency and a value of each of the plurality of security assets in the service balance based on the amount of the security pack and the weight of each of the security assets.

In particular embodiments, the payment service system 108 may make smart recommendations based on transactions between a user with one or more other users or merchants. As an example and not by way of limitation, the payment service system 108 may recommend a particular investment that a user may make using money the user just received from another user. As another example and not by way of limitation, the payment service system 108 may recommend a user to release certain investments for use in future payments.

The user's transaction history may comprise information stored by the payment service system for transactions executed using the payment service system. The transaction history may also comprise information stored by the payment service system for transactions executed using third-party companies, for which information is stored by the payment service system. The transaction history may also comprise information stored by the payment service system for transaction-related information generated by third-party companies, for which such information is stored by the payment service system.

The payment service system 108 may identify, based on the transaction history, a list of companies, wherein each of the companies is related to at least one product or service included in the transaction history. The payment service system 108 may likewise identify, based on the list of companies, security assets to include in the group, wherein selection of the security assets in the group is based on determining a level of interest of the user for each of the companies.

A company may be identified because it is a provider (e.g., manufacturer, wholesaler, retailer, distributor) of a product or service included in the transaction history, a competing provider of a product or service included in the transaction history, or provider of a product or service classified as being related to a product or service included in the transaction history (e.g., an athletic clothing and gear company may be identified if the user has purchased multiple registrations for marathons; alternatively, if the user sells bespoke suits, one of the identified companies may be a textile manufacturer).

Similarly, a company may be identified based on determining a frequency of transactions of the user related to a product or service that the company provides, an amount of revenue attributable to a product or service that the company provides, a sales trend related to a product or service that the company provides, or a market trend related to a product or service that the company provides. In some embodiments, a company may be identified because it is a corporate entity related to a company included in the transaction history (e.g., Gap, Inc. may be identified if Old Navy appears in the transaction history).

In particular embodiments, the payment service system 108 may use machine learning to make recommendations of asset packs to the user. For example, the payment service system 108 may collect data about other users who match a particular user's age, location, occupation, or other biographical characteristics. Given that people having similar biographical characteristics may have similar abilities to sustain risk or similar investment goals, the payment service system 108 may formulate recommendations for a particular user based on choices made by others determined to be similar. Collecting data from users who are investing in financial assets may be subject to one or more privacy settings associated with each user. The payment service system may only collect data from a particular user after permission is granted. The payment service system may anonymize the data before performing any analysis.

In particular embodiments, the payment service system 108 may dynamically construct and recommend security asset packs to the user based on information about the user available to the payment service system 108. The payment service system 108 may access a transaction history of the user (e.g., the transaction log 202 associated with the particular user) and generate a security asset pack based on an analysis of the transaction history. For example, the payment service system 108 may identify several restaurants or restaurant chains which the user frequently visits. The payment service system 108 may identify the company responsible for said restaurants and generate a security asset pack allowing the user to buy shares of the companies that operate the restaurants, e.g., an "Own What You Eat" security asset pack. As another example, the payment service system 108 may identify several stores (e.g., clothing stores, super markets) at which the customer frequently shops. The payment service system 108 may identify the companies that operate those stores and generate a security asset pack allowing the user to buy shares of those companies, e.g., an "Own Where You Shop" security asset pack. As another example, the payment service system 108 may identify brands associated with goods frequently or recently purchased by the user and generate and recommend a security asset pack allowing the user to buy shares of the companies that own those brands (e.g., consumer electronics brands, toy brands, clothing brands, automotive brands, etc.).

In particular embodiments, the payment service system 108 may access other information stored in a consumer data store 201 associated with the user. For example, the payment service system 108 may access demographic information about the user. The payment service system 108 may compare security assets or security asset packs owned by other users with similar demographic information to generate and recommend security asset packs for the user. The payment service system may compare demographic information such as age, nationality, country of origin, employment status, education level, home ownership, residence location, household income, marital status, gender, income level, any other suitable demographic information, or any combination thereof. For example, the payment service system 108 may compare an age range, marital status, and household income of the user to other users within that age range to generate a security asset pack allowing the user to buy security assets owned by people who are determined to be similar, e.g., a "People Like You Own" security asset pack. According to user preference, the payment service system 108 may analyze the demographic information and provide contrarian recommendations—for example, for investors who want to be contrarian with respect to their peers, the payment service system 108 may recommend a security asset pack based on security assets that are unpopular among users with similarities among one or more demographic categories. As another example, the payment service system may use particular characteristics about the user to identify companies with key personnel who share the particular characteristics. The payment service system may compare a user's self-identified nationality and gender to similar characteristics of the executives of a company to generate a security asset pack allowing the user to buy shares of companies with executives who are representative of the user. The payment service system may compare a user's attended college with the college attended by executives of companies to generate and recommend a security asset pack allowing the user to buy shares of companies founded by people who went to the same college, e.g., an "Alma Mater" security pack.

In particular embodiments, the payment service system 108 may access information about a user's social network and generate, adjust, and recommend security asset packs based on the security assets owned by other persons in the social network. The user may opt to allow the payment service system 108 to access one or more social networks, for example, by signing in to that social network and allowing the payment service system 108 access to the user's list of connections. Information from the social network, such as information from the user's social network profile, connection list, location history, or other information may be used to augment the customer data store 201 associated with the user. The payment service system may weight the information gained from the social network(s) based on user activity on the network (express or implied), user trust in the network, the nature of the network itself (e.g., information from a business-oriented network may be given more weight that information from a social-oriented network). The payment service system may also weight information associated with individual connection according to a degree of activity associated with the connection so that connections which the user more frequently communicates with may be given more weight. For example, the payment service system may analyze a list of bidirectional first-degree connections of the user to generate and recommend a security asset pack allowing the user to buy shares of companies that the user's bidirectional first-degree connections own, e.g., a "Your Friends Own" security asset pack. As another example, the payment service system may analyze a list of unidirectional connections of the user to generate and recommend a security asset pack allowing the user to buy shares of companies that the user's unidirectional connections own, e.g., a "People You Follow" security asset pack. The payment service system may also provide contrarian recommendations based on social network information.

In particular embodiments, the payment service system 108 may access geographic locations associated with the user and generate, adjust, and recommend security asset packs based on the geographic locations. The geographic location may be expressly supplied by the user (e.g., hometown, home address, work address etc.), may be implied by the user's transaction history (e.g., inferred from locations where the user regularly shops for groceries or where the user regularly purchases food around noon), may be provided by a mobile device of the user to the payment service system 108 (e.g., reported by a GPS transceiver of the user's mobile device), or may be provided to the payment service system in any other suitable fashion. As an example, the user may have provided a list of previous addresses to the payment service system 108 and indicated that the user grew up in a city where they do not currently reside. The payment service system may generate and recommend a security asset pack allowing the user to buy shares of well-performing companies headquartered in the user's hometown, e.g., a "Hometown Heroes" security asset pack. The payment service system 108 may receive a current location of the user and generate and recommend a security asset pack allowing the user to buy shares in the companies closest to the user's current location or to the top-value companies within a threshold distance of the user's location, e.g., a "Nearby Companies" security asset pack. The payment service system may receive a location history of the user and generate and recommend a security asset pack allowing the user to buy shares of companies which the user may have recently visited (whether or not they made a purchase during their visit), e.g., a "Recently Visited" security asset pack.

In particular embodiments, the payment service system 108 may generate, adjust, and recommend security asset packs based on commonalities between the companies included in the security asset packs. The payment service system 108 may access a variety of publicly-available information about the companies, determine common features between the companies or recent events involving the companies, and generate security asset packs which it determines may be of interest to the user. For example, the payment service system 108 may generate and recommend security asset packs comprising large companies in a particular sector, e.g., a "Big Tech" security asset pack. The payment service system 108 may generate and recommend security asset packs comprising companies reporting increasing headcounts that deal with a particular product, e.g., a "Growing Autonomous Vehicles" security asset pack. As another example, the payment service system 108 may determine commonalities between the executives of companies and generate and recommend security asset packs allowing the user to buy shares of companies based on the commonalities. The payment service system may identify companies with female CEOs and generate and recommend a security pack comprising those companies, e.g., a "Female Leaders" security asset pack. The payment service system may identify companies with young founders or CEOs and generate and recommend a security pack comprising those companies, e.g., a "Young Founders" security asset pack. The payment service system may identify companies with new executives and generate and recommend a security pack comprising those companies, e.g., a "New CEO" security asset pack. As another example, the payment service system 108 may analyze a news source or recent events when generating security asset packs. For example, the payment service system may generate and recommend a security asset pack comprising companies with recent positive news coverage, such as a new product launch, e.g., an "In the News" security asset pack. As another example, the payment service system 108 may generate security asset packs comprising companies with other recent events, such as newly-available shares, recent earnings reports, recent shareholder meetings, share price or market cap reaching a threshold value, or any other suitable event.

In particular embodiments, the payment service system may generate, adjust, and recommend security asset packs that specifically include merchants that have established a relationship with the payment service system 108. In making a recommendation, the payment service system may notify the user whether one or more of the recommended security assets is associated with a merchant (e.g., a merchant company) with a relationship with the payment service system. In particular embodiments, the payment service system 108, based on information gained due to the existing relationship, may be able to provide more accurate or up-to-date information that it may ordinarily provide about publicly traded companies. Additionally, the payment service system 108 may provide additional features to facilitate security asset transactions, or related transactions, between merchants with an existing relationship with the payment service system and one or more users. For example, the payment service system may provide the user with the opportunity to lend a merchant currency, security assets, or other financial instruments based on available information. The payment service system may notify a user of a risk-based rating associated with a loan to a merchant. The payment service system may allow a user to lend to a specific location of a merchant (e.g., a coffeeshop near the user's home, as opposed to one farther away). The merchant may be enabled to provide information about a proposed or requested loan, such as a purpose, or timeframe for repayment. In particular embodiments, the payment service system may allow a user to customize the loan offered, for example, by setting repayment terms or interest rates. In particular embodiments, the payment service system may recommend or fix such terms. Because the payment service system 108 has access to more information about merchants with a pre-existing relationship than companies with which it does not have a pre-existing relationship, the payment service system may provide more accurate recommendations for security asset packs and other financial transactions involving the merchants than in previous systems. The payment service system may also integrate publicly available information with this proprietary information.

In particular embodiments, in addition to considering the above information when determining the identity of stocks to include in security asset packs, the payment service system 108 may use the same types of information (individually or in combination) to determine the total number of stocks to include in the security asset pack and the percentage distribution of the purchase price of the selected stocks. In particular embodiments, the payment service system 108 may evenly distribute the purchase value among the security assets of the security asset pack (e.g., if the purchase value is set to $120, the payment service system may allocate $20 of the purchase value for each security asset). In particular embodiments, the payment service system 108 may distribute the purchase value among the security assets according to one or more techniques. For example, when determining a security asset pack based on the user's current location, the payment service system 108 may recommend a higher percentage of the value allocated to the security asset pack go towards companies with which the user has recently completed a transaction. As another example, the payment service system 108 may analyze a transaction history of the user and allocate a higher percentage of the purchase value for the security asset pack to companies associated with, or likely to be associated with, the transaction history of the user. The payment service system may use suitable information from any suitable source, as described herein, when distributing the purchase value. Additionally, the payment service system may adjust the weights of distribution according to certain rules, such as no individual stock may have more than 50% of the value, no stock may have less than 10% of the value, no pair of stocks may have more than 66% of the value, etc. The payment service system may also weight the value of stocks according to variables available from the source of security assets 145, including, but not limited to performance of the share price over a period of time, market cap of the company over a period of time, current share price, number of employees, price-to-earnings ratio, gross revenue, profit, share price beta, determined risk of the stock, any other suitable factor, or any suitable combination thereof. The weights and distributions of value are used by the payment service system when a user requests to purchase the security assets (for example, through interaction with a "Buy" button).

In particular embodiments, the payment service system may base recommended security asset packs on investment preferences of the user. The preferences may be implicitly stated or may be learned by analyzing the user's behavior and may be categorized as a calculation of an investment risk index. For example, the user may specify a risk profile for their investments so that the payment service system will not recommend them stocks in which they are not comfortable investing. A user selecting an aggressive investment profile may not be interested in investing in so-called "blue chip" stocks. Similarly, a user selecting a conservative investment profile may not be interested in investing in highly volatile stocks. The risk profile may be learned over time, for example by analyzing the security asset packs, and individual security assets, the user decides to purchase or follow. Other preferences may also be learned or expressly stated, such as preferences regarding specific economic sectors, size of companies, age of companies, range of products offered, share price, share price beta, any other suitable preferences, or any combination thereof. In particular embodiments, the payment service system 108 may provide users with a method to provide express feedback on recommended security packs. For example, users may be provided a user interface in which they may rate recommended user packs, such as by a positive or negative vote or variable rating scale system. Users may also be provided a way to provide more detailed feedback, such as a comment box.

In particular embodiments, the payment service system 108 may generate, adjust, and recommend asset packs based on the collective purchase history or rating activity of users of the payment service system 108. For example, the payment service system 108 may identify security assets or security asset packs that have experienced a recent change in purchasing frequency or volume and generate and recommend (or stop recommending) the security asset packs, e.g., a "Trending Now" asset pack. As another example, the payment service system 108 may identify security assets or security asset packs that have received a threshold number or percentage of positive ratings over a period of time. The payment service system 108 may generate and recommend security asset packs based on the ratings, allowing the user to own stocks that have been well-reviewed over the period of time, e.g., a "5 Stars This Month" or "Top-Rate Stocks All Time" security asset pack. In particular embodiments, the payment service system 108 may generate a rating profile of the user and may prepare recommendations based on similarities between the rating profile of the user and of other users of the payment service system 108.

Figure 5C:
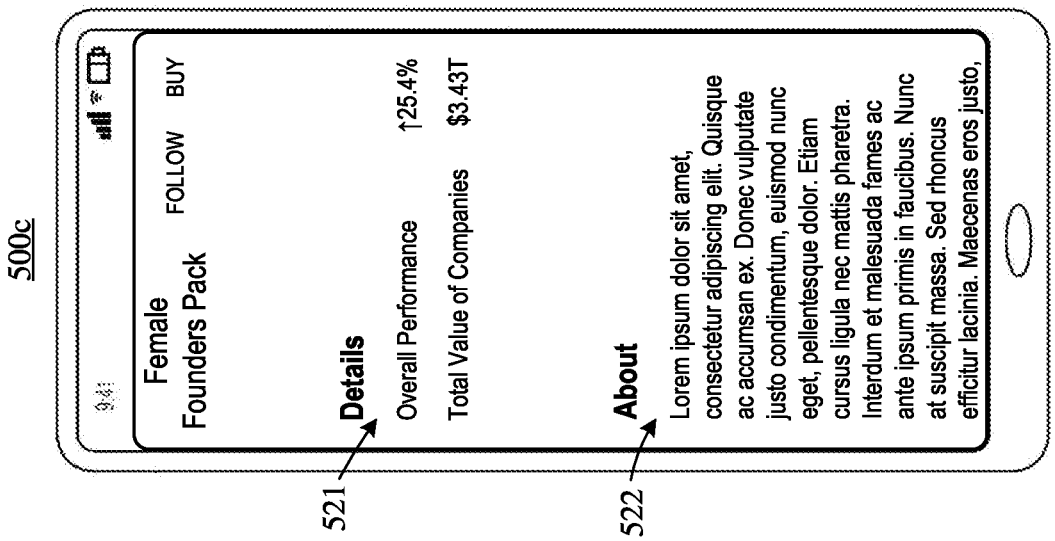
FIGS. 5A-5F illustrate example user interfaces associated with researching and purchasing groups of security assets.
Figure 5B:
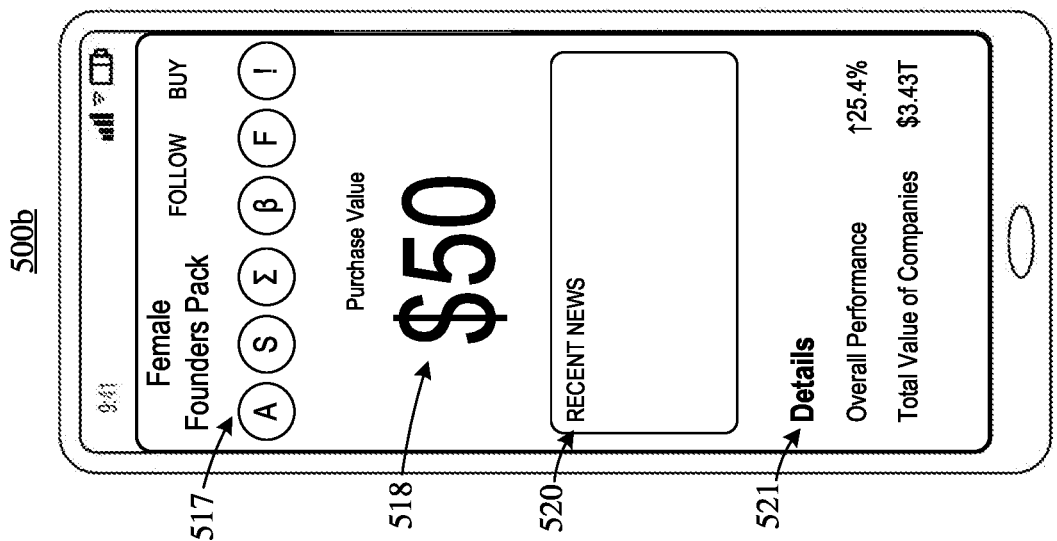
Figure 5A:
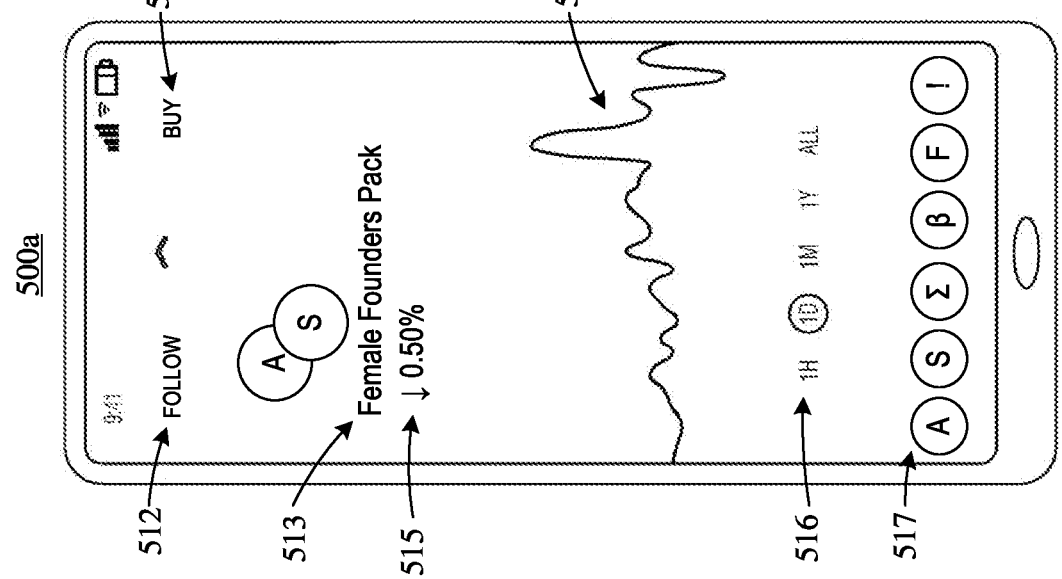

As illustrated in FIG. 5A, the payment service system may recommend a pack focused on stocks of companies founded by women, the "Female Founders Pack." The user interface 500*a* may comprise a "Buy" button 511 linking to a user interface for buying this pack and a "Follow" button 512 for adding this pack of assets to a followed-assets list of the user. The user interface 500*a* may comprise a field 513 indicating a title of the pack of stocks, a field 514 showing a chart visualizing the fluctuation of the value of the pack, a field 515 showing price change data in numeric format, and a field 516 allowing the user to choose a period of time for showing the price change of the pack of stocks. The user interface 500*a* may also comprise a field 517 showing a list of six stocks that are included in the pack, which may include a list of the names of the related companies and any recent price changes associated with each of the stocks.

FIG. 5B illustrates a user interface 500*b* shown after the user interacts with the user interface 500*a* to scroll down the interface or retrieve more information about the pack of security assets. The user interface 500*b* may comprise a pop-up section displaying information associated with the pack of stocks to be purchased. For example, field 517 shows a list of six stocks that are included in the pack. Field 520 shows headlines and interactable links related to the pack or to companies included in the pack. Field 521 shows a summary of recent performance of the stocks included in the pack ("Overall Performance") or summary information regarding the companies included in the pack (e.g., the "Total Value of Companies" or the combined market cap of the companies). Field 518 includes an interactive element allowing the user who has decided to purchase the pack to specify a purchase value (e.g., $50) to be used to purchase the pack. The user interface 500*b* includes other interactive elements allowing the user to follow 512 or buy 511 the pack. In particular embodiments, the user may engage with the buy button 511 to easily purchase an amount of the security pack equivalent to the value in field 518 (e.g., through one click). In particular embodiments, engaging the buy button 511 may take the user to a security asset purchase screen, for example, illustrated in FIGS. 4A-4H. The payment service system 108 may adjust the quantities of stock purchased to allow for fractional shares even if the stocks are generally sold in whole shares in public markets. This is enabled by the fact that the payment service system 108 holds whole shares of the stocks while assigning ownership in fractional shares to the user.

FIG. 5C illustrates a user interface 500*c* shown after the user interacts with the user interface 500*a* or 500*b* to further scroll down the interface or retrieve even more information about the pack of security assets. The user interface 500*c* may comprise fields displaying information associated with the pack of stocks to be purchased. For example, field 521 shows a summary of recent performance of the stocks included in the pack ("Overall Performance") or summary information regarding the companies included in the pack (e.g., the "Total Value of Companies" or the combined market cap of the companies). Field 522 shows information about the pack itself, such as the theory behind the creation of the pack, common elements to the companies represented, who created the pack (in the case of a user-created pack of assets), and other information that may be useful to a user considering whether to purchase shares of the pack. The user interface 500*b* includes other interactive elements allowing the user easily to follow 512 or buy 511 the pack.

Figure 5F:
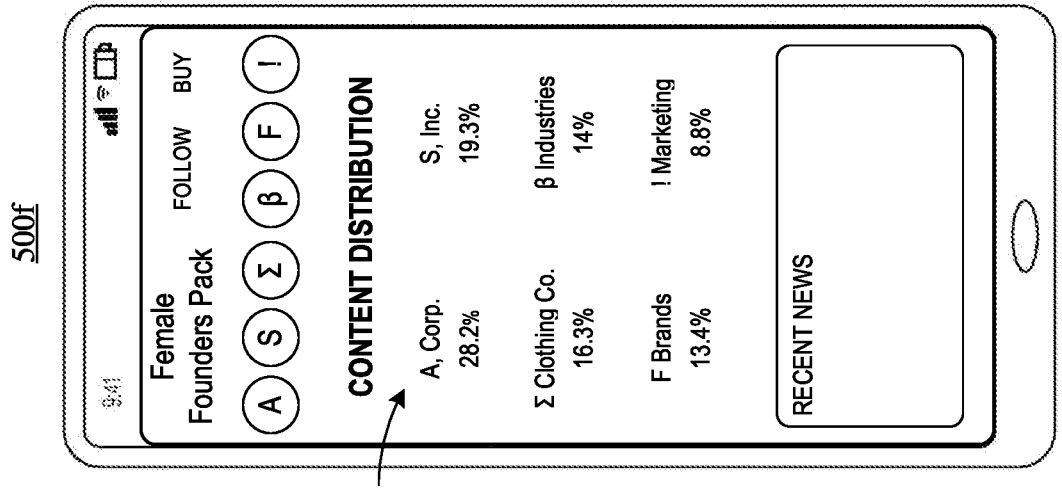
Figure 5E:
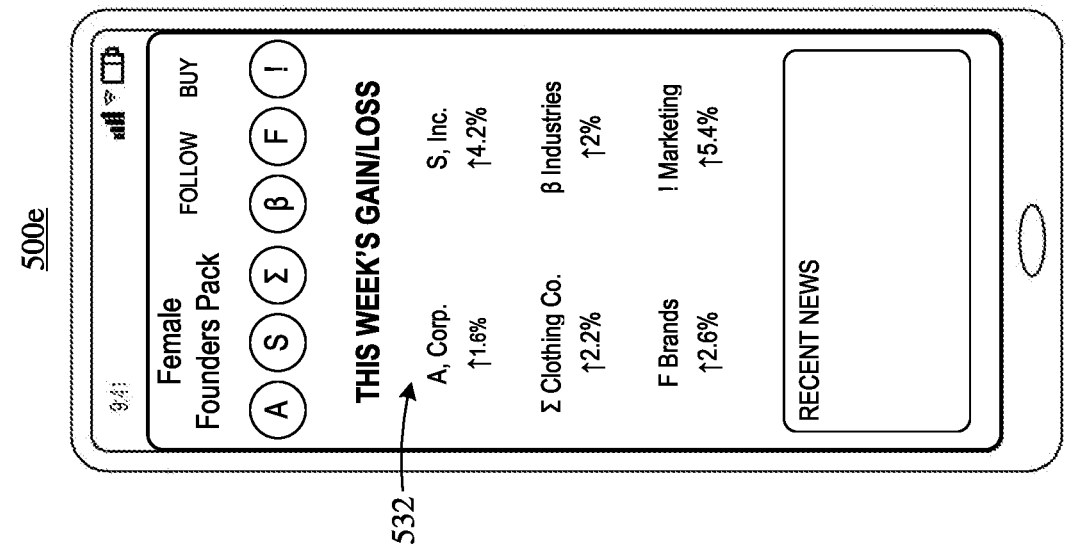
Figure 5D:
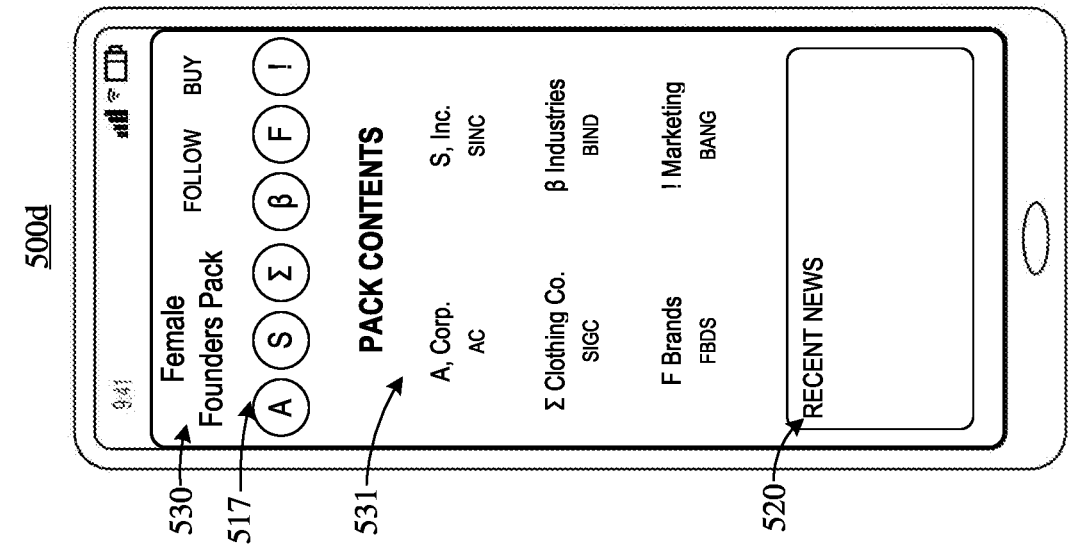

FIG. 5D illustrates a user interface 500*d* showing a detailed view regarding information about a security asset pack. The user interface 500*d* includes a field 530 comprising the name of the pack and a field 517 comprising a series of icons representing the stocks that are included in the pack. The field 531 provides a more detailed breakdown of the stocks. The field includes names (e.g., "A, Corp.", "S, Inc.", etc.) and associated stock ticker symbols (e.g., "AC" and "SINC", etc.) for the stocks included in the pack. The user interface 500*d* also includes a news reel pop-up 520 displaying recent headlines involving the companies of the pack. A user may interact with the new pop-up 520 to read the story or view other headlines. In some embodiments, a user may interact with the user interface 500*d* to see additional information about the pack. For example, the user may tap the pack contents field 531 to view additional information. The user may also swipe to the right or left on the user interface 500*d*.

FIG. 5E illustrates a user interface 500*e* that may be displayed by a mobile device after the user interacts with the user interface 500*d*. In addition to similar elements shown in FIG. 5D, user interface 500*d* includes a field 532 showing the performance of the individual stocks included in the pack. Field 532 includes the name of each company included in the pack and the relative performance of the share price of the company's stock. For example, field 532 indicates that the share price for A, Corp. is up 1.6% over the last week and that the share price from S, Inc. is up 4.2% over the same period of time. In particular embodiments, the user may be able to interact with the field 532 to change the information shown about the pack performance. For example, the field 532 may be configured to show the performance over different time frames (e.g., daily, monthly, year-to-date, etc.) or show the performance in difference metrics (e.g., raw price change, change relative to the market, change relative to the rest of the pack, etc.). In some embodiments, the user may interact with the user interface 500*e* to see additional information about the pack. For example, the user may tap the pack performance field 532 to view additional information. The user may also swipe to the right or left on the user interface 500*e*.

FIG. 5F illustrates a user interface 500*f* that may be displayed by a mobile device after the user interacts with the user interface 500*e*. In addition to similar elements shown in FIG. 5D, user interface 500*f* includes a field 533 showing the distribution of ownership of each company in the pack represented by ownership of a single share of the pack. Where the user has purchased shares of the pack, the field 533 may be configured to show the user's relative share of ownership of each stock in the pack. The field 533 may be configured to show value of the user's ownership of each stock (e.g., in terms of fiat currency invested). In particular embodiments, packs may be established as groups of stocks, where the user may purchase arbitrary amounts of the listed stocks. For example, a first user may decide to purchase an even distribution of all stocks in the pack while a second user may decide to purchase twice as much of three stocks (of the pack) as of the remaining stocks (of the pack). In particular embodiments, packs may be constructed with specified ownership ratios of the included stocks so that purchasing the pack equates to purchasing the specified ratio of the included stocks using the designated funds. For example, a user may decide to buy $100 worth of a pack. Based on the specified ratios, the payment processing system 108 may purchase $20 of a first stock, $15 of a second stock, $17 of a third stock, $17 of a fourth stock, $25 of a fifth stock, and $6 of a sixth stock.

Figure 6:
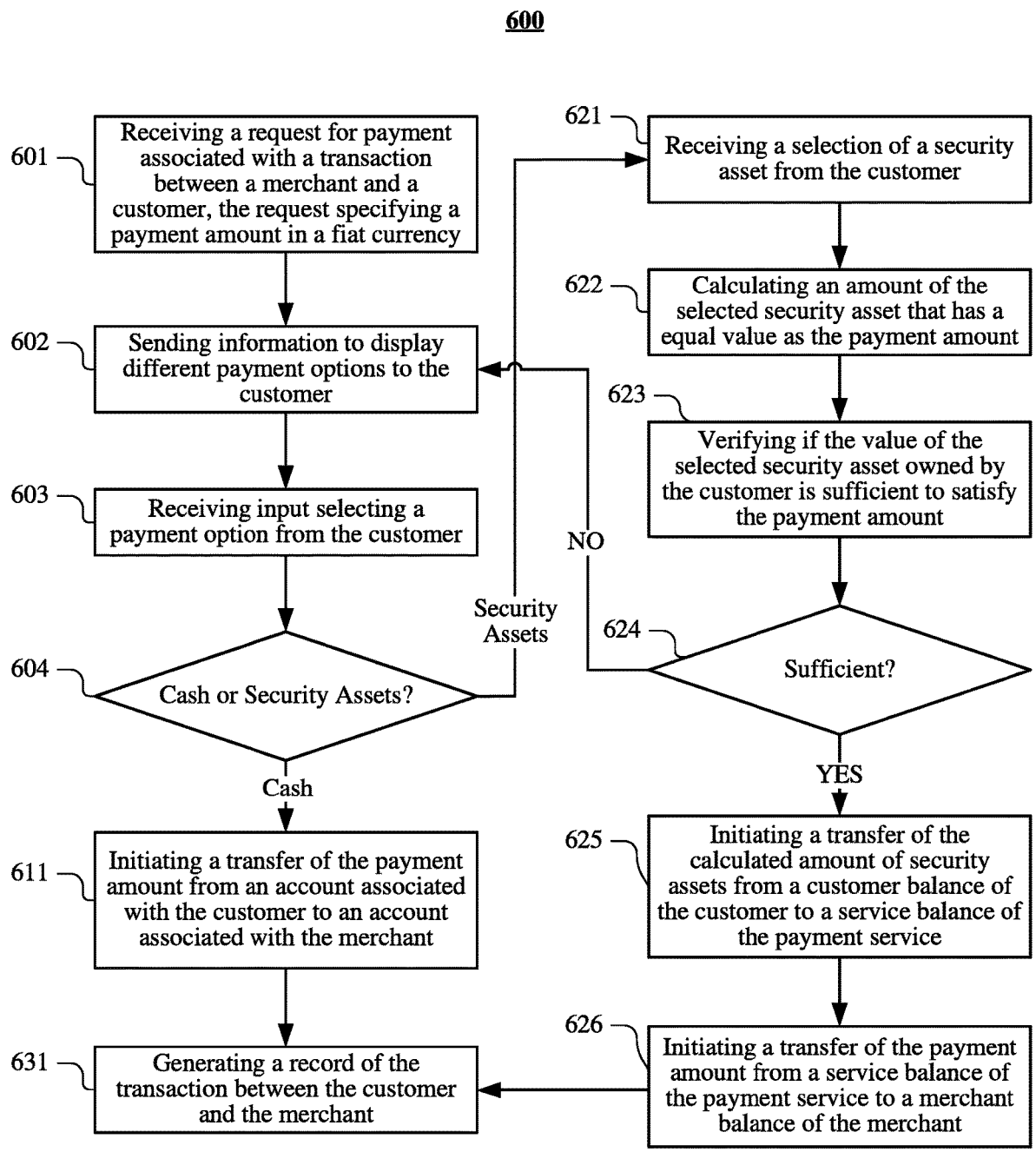
FIG. 6 illustrates an example method for settling a payment transaction between a customer and a merchant using security assets.

FIG. 6 illustrates an example method 600 for settling a payment transaction between a customer and a merchant using security assets. In particular embodiments, the payment service system 108 may allow a customer to pay for a transaction with a merchant using security assets held by the payment service system 108 and owned by the customer. The method 600 may begin at step 601, where the payment service system may receive, from a point-of-sale system 105 associated with the merchant, a request for payment associated with the transaction. The request may specify a payment amount in a fiat currency. The request for payment may comprise a customer identifier corresponding to the customer and a merchant identifier corresponding to the merchant. The request for payment may be sent in response to a transaction that occurred at a point-of-sale system 105 associated with the merchant. The customer may pay for the transaction using a physical card issued by the payment service system 108 or a virtual card displayed by a mobile application 107 associated with the payment service system 108.

At step 602, the payment service system 108 may send, to a computing device 103 associated with the customer, information to display the request for payment with different payment options. The different payment options may correspond to using different assets to pay for the transaction. The payment options may comprise an option to pay using cash managed by the payment service system, an option to pay using a credit card or debit card issued by a third-party financial institution, an option to pay using a cryptocurrency, an option to pay using security assets owned by the customer, other suitable options, or any combination thereof. The security assets used to pay for the transaction may be held by the payment service system 108 and assigned to the customer. The assignment may be documented in one or more ledgers associated with the customer stored by the payment service system 108.

In particular embodiments, the different payment options may be displayed with one or more suggestions for a payment method to use. The payment service system 108 may recommend one or more of the payment options based on information about the customer available to the payment service system 108. The payment service system 108 may compare the price of the transaction to funds available in one or more financial accounts associated with the user. Based on the comparison, the payment service system 108 may recommend a particular transaction payment method. For example, if the cost of the transaction exceeds the available currency in the customer's currency account, the payment service system 108 may recommend that the customer pay for the transaction using security assets owned by the customer. The payment service system 108 may compare the price of the transaction to one or more thresholds that may be set by the customer or by the payment service system 108. For example, the customer may have set thresholds indicating that for purchases less than a first threshold (e.g., $100), the customer's preferred method of payment is to use their currency account. The customer may have set a second threshold indicating that for purchases between the first and second threshold (e.g., between $100 and $500), the customer's preferred method of payment is to use a credit card issued by a particular financial institution. The payment method recommendations made by the payment service system 108 may be personalized to the particular customer based on factors including, but not limited to, the customer's transaction history, the customer's balance history, projected or expected yield of the transaction, demographic groups associated with the customer, the customer's stated or inferred preferences, the customer's social network, and other suitable factors. The payment method recommendations made by the payment service system 108 may be further personalized based on the merchant, for example based on the identity or location of the merchant, the type of merchant, the merchant category, the size of the merchant (in terms of numbers of locations, volume of sales, etc.), a transaction history between the customer and the merchant, and a variety of other suitable factors.

At step 603, the payment service system 108 may receive an input selecting one of the payment options from the computing device 103 associated with the customer. Then, at step 604, the payment service system 108 may determine which option was selected by the customer. If the customer chooses to make the payment in cash, the payment service system 108 may proceed to step 611. If the customer chooses to make the payment using security assets, the payment service system 108 may proceed to step 621.

At step 611, the payment service system 108 may initiate a transfer of the payment amount from an account associated with the customer to an account associated with the merchant. The accounts may both be financial accounts holding cash of a particular fiat currency. Each account may be managed by the payment service system 108 or by a third-party financial institution. Then, at step 631, the payment service system 108 may generate a record of the transaction between the customer and the merchant.

At step 621, the payment service system 108 may receive a selection of a security asset from the computing device 103 associated with the customer. After the customer chooses to pay for the transaction using security assets, the payment service system 108 may send, to the computing device 103 associated with the customer, information to display a list of security assets owned by the customer. The list of security assets may comprise, for example, stocks, bonds, stock options, futures contracts, exchange-tradable funds, notes, other suitable security assets, or any combination thereof. The payment service system 108 may make one or more recommendations regarding which security asset to use to fulfil the payment (e.g., a last-purchased stock, stocks with the most gain/losses). The customer may provide an input selecting one of the security assets. The computing device 103 associated with the customer may then send such an input to the payment service system 108.

At step 622, the payment service system 108 may calculate a quantity of the selected security asset that has an equal value as the payment amount specified in the request for payment. The calculation may be based on a current price of the security asset with respect to a fiat currency acceptable by the merchant. The calculation may alternatively be based on an average price of the security asset within a predetermined time period.

At step 623, the payment service system 108 may verify if a value of the selected security asset held by the payment service system and assigned to the customer is sufficient to satisfy the payment amount. The value may be calculated based on a real-time price of the security asset. At step 624, if the security asset owned by the customer is determined to be sufficient, the payment service system 108 may proceed to step 625. Otherwise, the payment service system may return to step 602 and provide options for the customer to select payment options or another security asset.

At step 625, the payment service system 108 may initiate a transfer of at least a portion of the value of the security asset from a customer balance of the customer to a service balance of the payment service system. The portion of the value of the security asset may equal the amount of the selected security asset that is calculated at step 622. The customer balance and the service balance may each include a value of security asserts and a value of fiat currency and is stored in a data structure maintained by the payment service system. The transfer of the security asset may be carried out by debiting a securities ledger 205 (or securities account 206) associated with the customer and crediting a securities ledger 215 (or securities account 216) associated with the payment service system 108. Here, the amount of security asset transferred may comprise a fractional number of a base unit of the security asset. For example, if the security asset is a company's stock, it may compare a fraction of a share. At step 626, the payment service system 108 may initiate a transfer of a value in the fiat currency from the service balance of the payment service system to a merchant balance of the merchant. The merchant balance may be stored in the data structure maintained by the payment service system. The payment service system 108 may automatically convert the amount of security asset received from the customer to a corresponding value of fiat currency and transfer the fiat currency to the merchant. The fiat currency may be transferred to the merchant by debiting the currency ledger 213 (or currency account 214) associated with the payment service system 108 and crediting the currency ledger 209 (and currency account 210) associated with the merchant.

After completing the transfer of assets, the payment service system 108 may proceed to step 631 and generate a record of the transaction between the customer and the merchant. The record of the transaction may be stored by the payment service system 108 in one or more data stores associated with the payment service system 108 (e.g., transaction log 202 in the customer profile 132, transaction log 208 in the merchant profile 134). The payment service system may also generate and send one or more notifications or reports about the transaction. For example, the payment service system may send, to the point-of-sale system 105 associated with the merchant, a report associated with the record of the transaction. The report may specify the customer identifier and amount paid as the value in the fiat currency without disclosing that the payment was made in the security asset. The payment service system may also send, to the computing device 103 associated with the customer, a notification associated with the record, where the notification may specify the amount of security assets used to satisfy the payment.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for settling a payment transaction between a customer and a merchant using security assets including the particular steps of the method of FIG. 6, this disclosure contemplates any suitable method for settling a payment transaction between a customer and a merchant using security assets including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, a user may authorize the payment service system 108 to share information about the user's investment to a community of other users. The payment service system 108 may provide the user options as to the other users to share the information with (e.g., friends, friends of friends, manually-identified users). The information shared may include, for example, the financial assets chosen by the sharing user. The information may be offered for free or for purchase depending on the choice of the sharing user. In particular, a user may maintain her selection of a number of security assets (e.g., six stocks or a "six pack") as "trade secret" or a "secret formula" and offer such secret information for sale to other users. The other users may pay a fee to the sharing user to access the information associated with the selection of the security assets. For a user willing to share her investment information for a fee, the payment service system 108 may intelligently recommend a price for the user and dynamically adjust the price so as to ensure a broad reach of the secret formula. A user may request to add another user to be a "coach" based on information shared by the other user (e.g., information showing an excellent track record of investments). The other user, if the other user accepts the request, may help the requesting user to plan investment strategy for compensation.

In particular embodiments, the payment service system 108 may offer various other tools to facilitate a user's investment activities. As an example and not by way of limitation, the payment service system 108 may send notifications to users when a certain mark is crossed or when a certain milestone is missed. The notification policy may be set by the user. A user may also set one or more types of alerts. Based on information it receives about security assets, the payment service system 108 may deliver alerts or tips to a user to inform the user as to investment decisions.

In particular embodiments, the payment service system 108 may dynamically adjust its holdings of security assets to control the amount of security assets owned by the payment service system 108. In particular embodiments, the payment service system 108 may determine, for each of a plurality of security assets, a value of the security asset in the service balance. It may then calculate a risk index associated with each of the security assets based on the value of the security asset in the service balance. Based on the risk index, the payment service system 108 may initiate one or more transactions each comprising buying at least one of the security assets from or selling at least one of the security assets to a third-party source of security assets 145.

Figure 7:
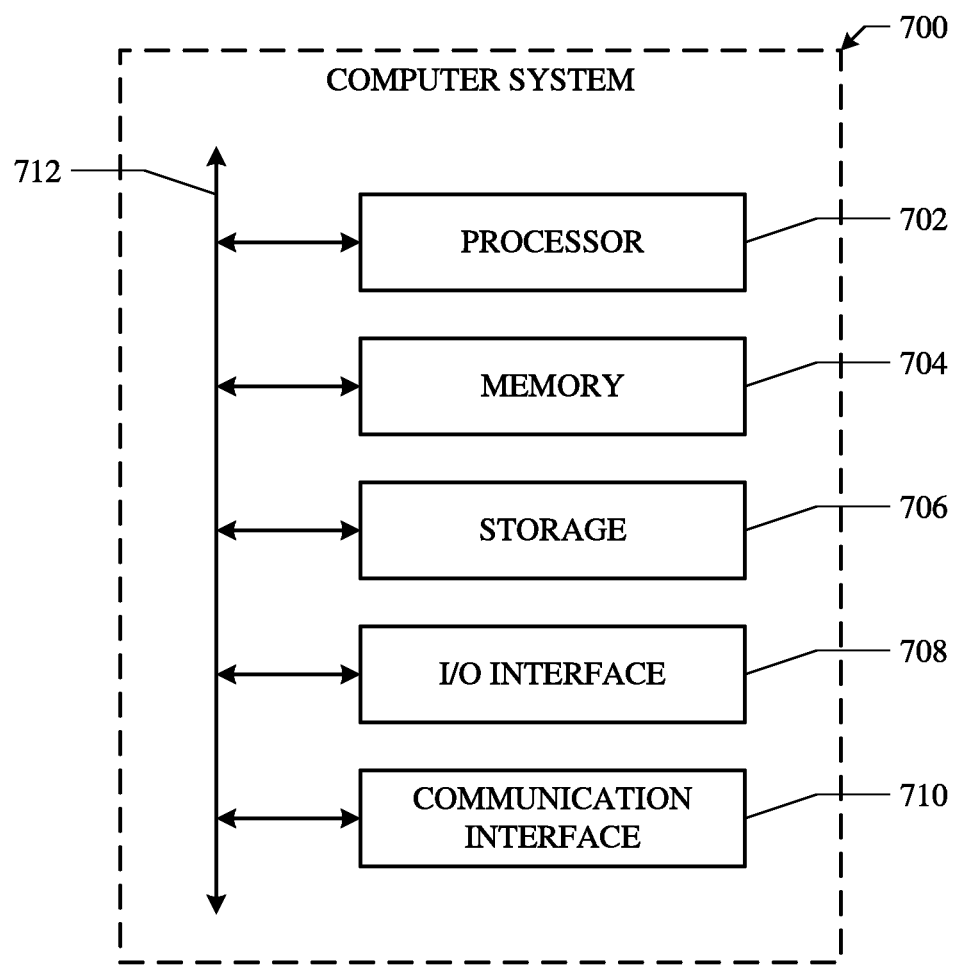
FIG. 7 illustrates an example computer system.

FIG. 7 illustrates an example computer system 700. The computer system 700 may be a computer system associated with the payment service system 108, POS device 105, or customer device 103. While these devices may have components in common, such as those illustrated in FIG. 7, it should be appreciated that each of the payment service system 108, POS device 105, or customer device 103 may be specialized devices configured for their specific purposes. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As an example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus for facilitating asset transactions, the apparatus comprising:
   at least one memory; and
   at least one processor coupled to the at least one memory, the at least one processor configured to:
   receive information about a user;
   determine, based on the information about the user, at least one preference of the user;
   generate, based on the at least one preference of the user, a recommendation for an asset pack for the user, wherein the asset pack includes a plurality of different assets that are grouped together, wherein respective relative amounts of each asset are customized in the asset pack as part of the recommendation based on how applicable at least one criterion is to each of the plurality of different assets, wherein the at least one criterion corresponds to feedback associated with the plurality of different assets, wherein the feedback is previously received from one or more other users other than the user, wherein the at least one criterion is based on the at least one preference;
   cause the recommendation for the asset pack to be output via an interactive graphical user interface of an application associated with a payment service system and executing on a device associated with the user, wherein the interactive graphical user interface includes an interactive representation of the respective relative amounts of each asset in the asset pack configured for adjustment of the respective relative amounts of each asset in the asset pack, wherein the interactive graphical user interface is configured to be displayed using a display of the device;

receive, via a first interaction with the interactive graphical user interface, an indication of an adjustment to the respective relative amounts of each asset in the asset pack, wherein the first interaction is based on a first input received via a first position of a touchscreen-based input interface of the device to select one of a plurality of pre-determined options for adjusting the respective relative amounts of each asset in the asset pack, wherein a plurality of sensors of the touchscreen-based input interface of the device detect that the first input is received via the first position, wherein user interface elements respectively associated with the plurality of pre-determined options are positioned at a plurality of different positions within the interactive graphical user interface, wherein the first position of the first input aligns with one of the plurality of different positions that corresponds to the one of the plurality of pre-determined options, wherein the one of the plurality of pre-determined options identifies the adjustment, and wherein the interactive graphical user interface automatically and dynamically updates a displayed summary of the respective relative amounts of each asset in the asset pack at a second position in the interactive graphical user interface in response to the adjustment following the first interaction;

receive, via a second interaction with the interactive graphical user interface, a confirmation associated with the recommendation for the asset pack as adjusted by the adjustment and an indication of an amount of funds to invest in the asset pack, wherein the second interaction is based on a second input received via the touchscreen-based input interface of the device;

receive an indication that the amount of funds has been received at the payment service system from an account associated with the user; and facilitate, in response to the second interaction and the indication, processing of a plurality of transactions to purchase the plurality of different assets in the asset pack on behalf of the user according to the amount of funds to invest in the asset pack and according to the respective relative amounts of each asset.

2. The apparatus of claim 1, wherein the information about the user includes a transaction history of the user that identifies a plurality of prior transactions involving the user, wherein the at least one preference and the at least one criterion are based on a trend identified in the transaction history of the user.

3. The apparatus of claim 1, wherein the information about the user includes demographic information about the user, wherein the at least one preference and the at least one criterion are based on assets that at least a subset of a second set of one or more other users who share at least one aspect of the demographic information have invested in.

4. The apparatus of claim 1, wherein the information about the user identifies a plurality of social network contacts of the user, wherein the at least one preference and the at least one criterion are based on assets that at least a subset of the plurality of social network contacts of the user have invested in.

5. The apparatus of claim 1, wherein at least a subset of the plurality of different assets are security assets associated with different companies, wherein the different companies all meet the at least one criterion, wherein the at least one criterion is associated with at least one of industry, stage of growth, risk, or diversity.

6. The apparatus of claim 1, wherein generating the recommendation for the asset pack for the user includes identifying the asset pack from a set of pre-generated asset packs based on the at least one criterion.

7. The apparatus of claim 1, wherein generating the recommendation for the asset pack for the user includes personalizing the asset pack based on the user.

8. The apparatus of claim 1, wherein the at least one processor is configured to:

track a total value of the plurality of different assets in the asset pack as purchased in the plurality of transactions.

9. The apparatus of claim 1, wherein the at least one processor is configured to:

track a total value of the plurality of different assets in the asset pack over a period of time having a specified length and according to a specified investment amount, wherein the recommendation for the asset pack includes an indication of the total value of the plurality of different assets in the asset pack as tracked over the period of time and according to the specified investment amount.

10. The apparatus of claim 1, wherein the plurality of different assets in the asset pack include at least one of security assets, stocks, bonds, stock futures, tangible asset futures, or cryptocurrencies.

11. The apparatus of claim 1, wherein the at least one processor is configured to:

track ownership of the plurality of different assets in the asset pack by the user in at least one ledger associated with the payment service system.

12. The apparatus of claim 11, wherein the at least one ledger incudes at least one distributed ledger.

13. The apparatus of claim 1, wherein the at least one processor is configured to:

generate, based on financial information about the user, a second recommendation for the amount of funds to invest in the asset pack, wherein the indication of the amount of funds to invest in the asset pack includes a second confirmation of the second recommendation for the amount of funds to invest in the asset pack.

14. The apparatus of claim 1, wherein the at least one processor is configured to:

identify a second user, wherein the second user is associated with the user; and based on the second user being associated with the user, cause the recommendation for the asset pack to be output via a second user interface of the application associated with the payment service system and executing on a second device associated with the second user.

15. A method of facilitating asset transactions, the method comprising:

receiving, by a payment service system, information about a user;

determining, by the payment service system and based on the information about the user, at least one preference of the user;

generating, by the payment service system and based on the at least one preference of the user, a recommendation for an asset pack for the user, wherein the asset pack includes a plurality of different assets that are grouped together, wherein respective relative amounts of each asset are customized in the asset pack as part of the recommendation based on how applicable at least one criterion is to each of the plurality of different assets, wherein the at least one criterion corresponds to feedback associated with the plurality of different assets, wherein the feedback is previously received from one or more other users other than the user, wherein the at least one criterion is based on the at least one preference;

causing the recommendation for the asset pack to be output via an interactive graphical user interface of an application associated with a payment service system and executing on a device associated with the user, wherein the interactive graphical user interface includes an interactive representation of the respective relative amounts of each asset in the asset pack configured for adjustment of the respective relative amounts of each asset in the asset pack, wherein the interactive graphical user interface is configured to be displayed using a display of the device;

receiving, via a first interaction with the interactive graphical user interface, an indication of an adjustment to the respective relative amounts of each asset in the asset pack, wherein the first interaction is based on a first input received via a first position of a touchscreen-based input interface of the device to select one of a plurality of pre-determined options for adjusting the respective relative amounts of each asset in the asset pack, wherein a plurality of sensors of the touchscreen-based input interface of the device detect that the first input is received via the first position, wherein user interface elements respectively associated with the plurality of pre-determined options are positioned at a plurality of different positions within the interactive graphical user interface, wherein the first position of the first input aligns with one of the plurality of different positions that corresponds to the one of the plurality of pre-determined options, wherein the one of the plurality of pre-determined options identifies the adjustment, and wherein the interactive graphical user interface automatically and dynamically updates a displayed summary of the respective relative amounts of each asset in the asset pack at a second position in the interactive graphical user interface in response to the adjustment following the first interaction;

receiving, by the payment service system and via a second interaction with the interactive graphical user interface, a confirmation associated with the recommendation for the asset pack as adjusted by the adjustment and an indication of an amount of funds to invest in the asset pack, wherein the second interaction is based on a second input received at the touchscreen-based input interface of the device;

receiving, by the payment service system, an indication that the amount of funds has been received at the payment service system from an account associated with the user; and facilitating, by the payment service system and in response to the second interaction and the indication, processing of a plurality of transactions to purchase the plurality of different assets in the asset pack on behalf of the user according to the amount of funds to invest in the asset pack and according to the respective relative amounts of each asset.

16. The method of claim 15, wherein the information about the user includes a transaction history of the user that identifies a plurality of prior transactions involving the user, wherein the at least one preference and the at least one criterion are based on a trend identified in the transaction history of the user.

17. The method of claim 15, wherein the information about the user includes demographic information about the user, wherein the at least one preference and the at least one criterion are based on assets that at least a subset of a second set of one or more other users who share at least one aspect of the demographic information have invested in.

18. The method of claim 15, wherein the information about the user identifies a plurality of social network contacts of the user, wherein the at least one preference and the at least one criterion are based on assets that at least a subset of the plurality of social network contacts of the user have invested in.

19. The method of claim 15, wherein at least a subset of the plurality of different assets are security assets associated with different companies, wherein the different companies all meet the at least one criterion, wherein the at least one criterion is associated with at least one of industry, stage of growth, risk, or diversity.

20. The method of claim 15, wherein generating the recommendation for the asset pack for the user includes identifying the asset pack from a set of pre-generated asset packs based on the at least one criterion.

21. The method of claim 15, wherein generating the recommendation for the asset pack for the user includes personalizing the asset pack based on the user.

22. The method of claim 15, further comprising:
tracking a total value of the plurality of different assets in the asset pack as purchased in the plurality of transactions.

23. The method of claim 15, further comprising:
tracking a total value of the plurality of different assets in the asset pack over a period of time having a specified length and according to a specified investment amount, wherein the recommendation for the asset pack includes an indication of the total value of the plurality of different assets in the asset pack as tracked over the period of time and according to the specified investment amount.

24. The method of claim 15, wherein the plurality of different assets in the asset pack include at least one of security assets, stocks, bonds, stock futures, tangible asset futures, or cryptocurrencies.

25. The method of claim 15, further comprising:
tracking ownership of the plurality of different assets in the asset pack by the user in at least one ledger associated with the payment service system.

26. The method of claim 25, wherein the at least one ledger incudes at least one distributed ledger.

27. The method of claim 15, further comprising:
generating, based on financial information about the user, a second recommendation for the amount of funds to invest in the asset pack, wherein the indication of the amount of funds to invest in the asset pack includes a second confirmation of the second recommendation for the amount of funds to invest in the asset pack.

28. The method of claim 15, further comprising:
identifying a second user, wherein the second user is associated with the user; and
based on the second user being associated with the user, causing the recommendation for the asset pack to be output via a second user interface of the application associated with the payment service system and executing on a second device associated with the second user.

\* \* \* \* \*